(12) United States Patent
Kozlowski et al.

(10) Patent No.: US 11,945,349 B2
(45) Date of Patent: Apr. 2, 2024

(54) PROCESS FOR MOLDING COVER MATERIALS FOR SEATING APPLICATIONS

(71) Applicant: Magna Seating Inc., Aurora (CA)

(72) Inventors: Eric Kozlowski, Oakland Township, MI (US); Craig Prasatek, Rochester, MI (US); Andrew M Vivian, Fayette, OH (US)

(73) Assignee: MAGNA SEATING INC., Aurora (CA)

( * ) Notice: Subject to any disclaimer, the term of this patent is extended or adjusted under 35 U.S.C. 154(b) by 633 days.

(21) Appl. No.: 15/733,934

(22) PCT Filed: Jun. 3, 2019

(86) PCT No.: PCT/US2019/035244
§ 371 (c)(1),
(2) Date: Dec. 1, 2020

(87) PCT Pub. No.: WO2019/232538
PCT Pub. Date: Dec. 5, 2019

(65) Prior Publication Data
US 2021/0221266 A1 Jul. 22, 2021

Related U.S. Application Data

(60) Provisional application No. 62/845,928, filed on May 10, 2019, provisional application No. 62/679,053, filed on Jun. 1, 2018.

(51) Int. Cl.
*B60N 2/58* (2006.01)
*B29C 43/00* (2006.01)
(Continued)

(52) U.S. Cl.
CPC .......... *B60N 2/5891* (2013.01); *B29C 43/003* (2013.01); *B29C 43/18* (2013.01);
(Continued)

(58) Field of Classification Search
CPC ... B60N 2/5875; B60N 2/5891; B60N 2/5833
See application file for complete search history.

(56) References Cited

U.S. PATENT DOCUMENTS 4,692,199 A 9/1987 Kozlowski et al.
4,722,760 A 2/1988 Shimada
(Continued)

FOREIGN PATENT DOCUMENTS

KR 1020160109902 9/2016
KR 101881492 8/2018

*Primary Examiner* — Rodney B White
(74) *Attorney, Agent, or Firm* — Miller Canfield

(57) ABSTRACT

A seat trim cover for an automotive seat is formed into a 3-dimensional shape by compression molding a laminated moldable foam in a 3-dimensional. The laminated moldable foam comprises at least a layer of cellular polyurethane foam compression moldable in a temperature range of about 220° F. to about 260° F. The 3-dimensional mold is heated to a temperature range of about 150° F. to about 320° F. The layer of cellular foam is adhered to a cover material layer and pre-cut into a pre-laminated blank prior to molding into the 3-dimensional shape. Optionally, seat heaters or other components can be integrated with the laminated foam prior to compression molding the seat trim cover.

18 Claims, 17 Drawing Sheets

(51) Int. Cl.

| | | |
|---|---|---|
| *B29C 43/18* | (2006.01) | |
| *B29C 43/20* | (2006.01) | |
| *B60N 2/56* | (2006.01) | |
| B29K 75/00 | (2006.01) | |
| B29K 105/04 | (2006.01) | |
| B29L 31/58 | (2006.01) | |
| B32B 5/24 | (2006.01) | |
| B32B 7/09 | (2019.01) | |
| B32B 7/12 | (2006.01) | |

(52) U.S. Cl.
CPC ........ *B29C 43/203* (2013.01); *B60N 2/5685* (2013.01); *B60N 2/5833* (2013.01); *B29C 2043/185* (2013.01); *B29K 2075/00* (2013.01); *B29K 2105/045* (2013.01); *B29L 2031/58* (2013.01); *B32B 5/245* (2013.01); *B32B 7/09* (2019.01); *B32B 7/12* (2013.01); *B32B 2266/0278* (2013.01); *B32B 2601/00* (2013.01); *B60N 2/5875* (2013.01)

(56) References Cited

U.S. PATENT DOCUMENTS

| | | | |
|---|---|---|---|
| 4,795,517 A | 1/1989 | Elliott et al. | |
| 4,867,826 A | 9/1989 | Wayte | |
| 5,089,191 A * | 2/1992 | Hughes | B60N 2/5891 264/46.7 |
| 5,096,639 A * | 3/1992 | Hughes | B60N 2/5875 264/46.4 |
| 5,468,434 A | 11/1995 | Powell et al. | |
| 5,534,097 A | 7/1996 | Fasano et al. | |
| 5,858,159 A * | 1/1999 | Holbrook | B29C 63/025 297/452.38 |
| 6,148,487 A * | 11/2000 | Billarant | B29C 33/16 24/444 |
| 7,837,263 B2 | 11/2010 | Booth et al. | |
| 8,118,363 B2 * | 2/2012 | Tanaka | D04B 21/16 297/218.2 X |
| 8,794,708 B2 | 8/2014 | Besnard et al. | |
| 10,099,583 B2 * | 10/2018 | Schulze | B60N 2/5833 |
| 10,384,573 B2 * | 8/2019 | Izukawa | B68G 7/05 |
| 10,682,935 B2 * | 6/2020 | Lewis | B60N 2/5825 |
| 2005/0025954 A1 | 2/2005 | Sullivan et al. | |
| 2005/0238842 A1 * | 10/2005 | Schindzielorz | B60N 2/70 297/452.48 X |
| 2007/0119032 A1 | 5/2007 | Efremova et al. | |
| 2007/0131347 A1 * | 6/2007 | Boes | B32B 1/00 156/272.2 |
| 2017/0028887 A1 * | 2/2017 | Schulze | B60N 2/5825 |
| 2017/0305126 A1 * | 10/2017 | Takeshita | B32B 27/365 |
| 2018/0154843 A1 | 6/2018 | Townley et al. | |
| 2019/0070988 A1 * | 3/2019 | Sung | B32B 37/14 |
| 2020/0384901 A1 * | 12/2020 | Ali | B60N 2/5875 |

* cited by examiner

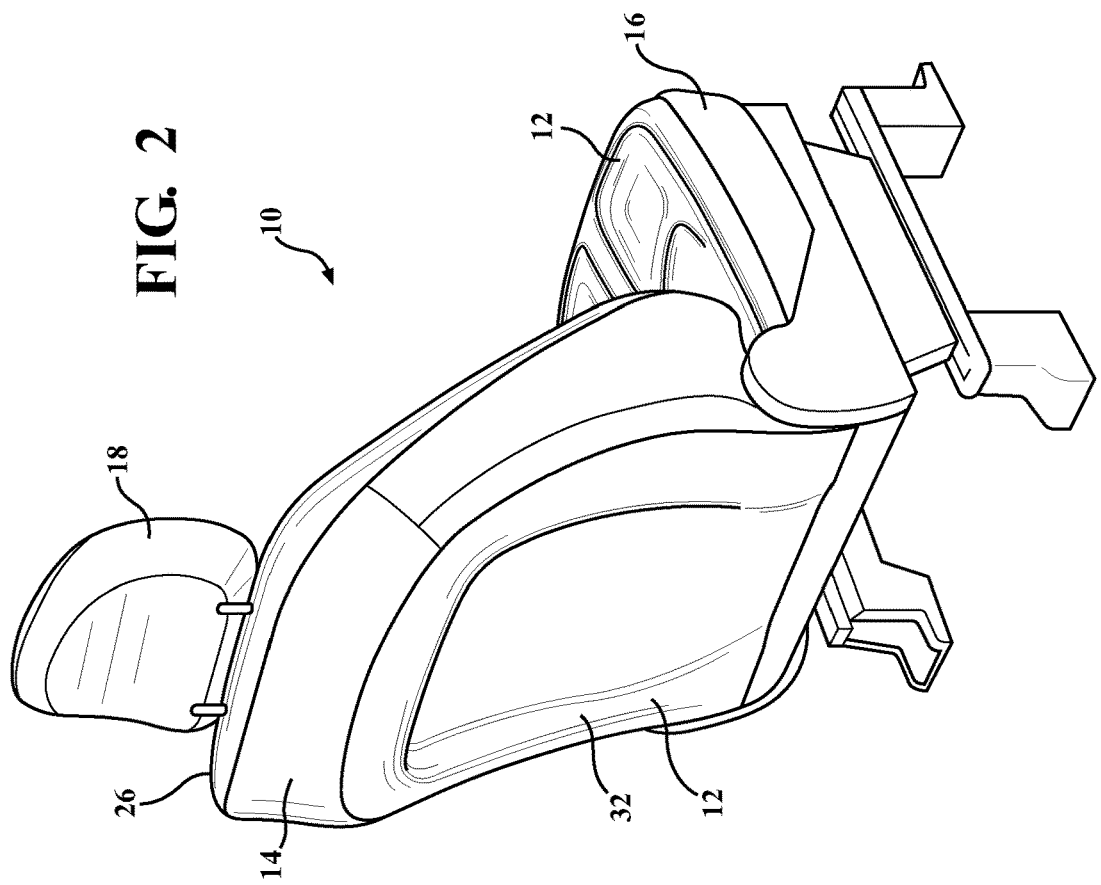
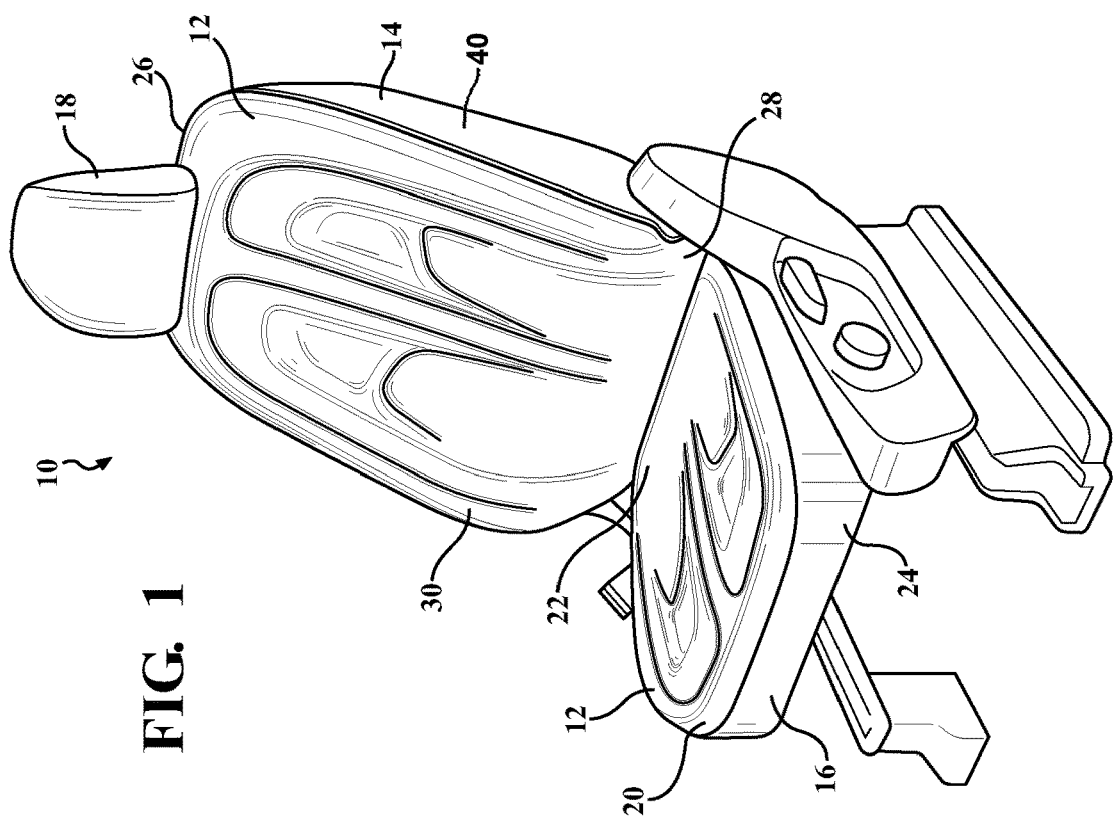

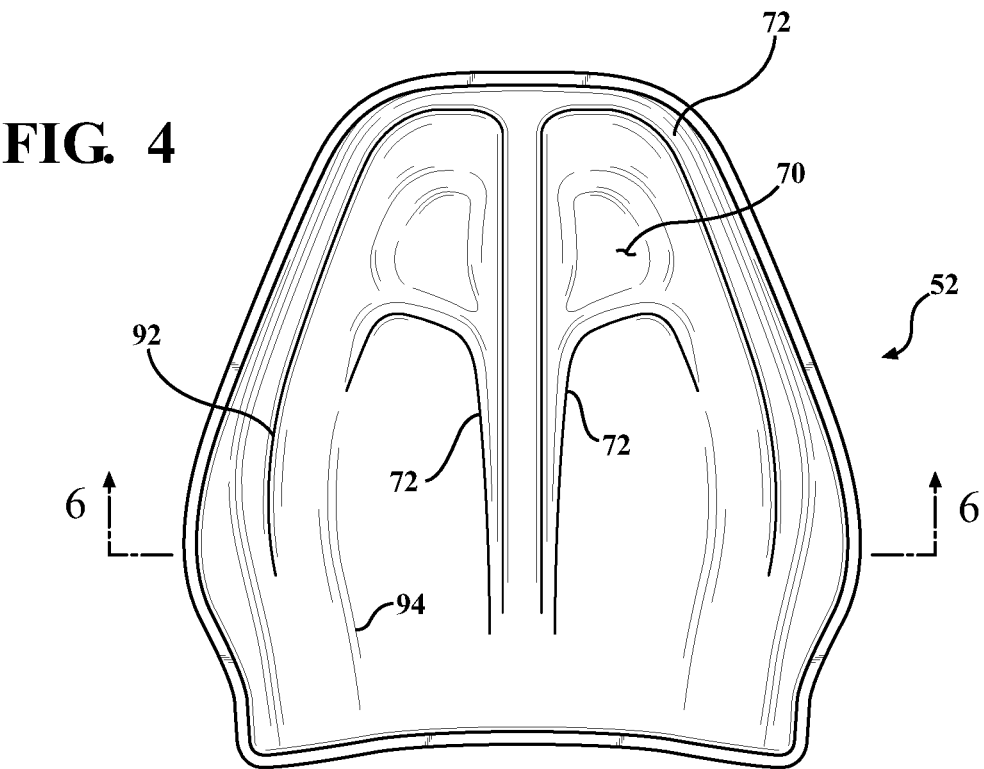
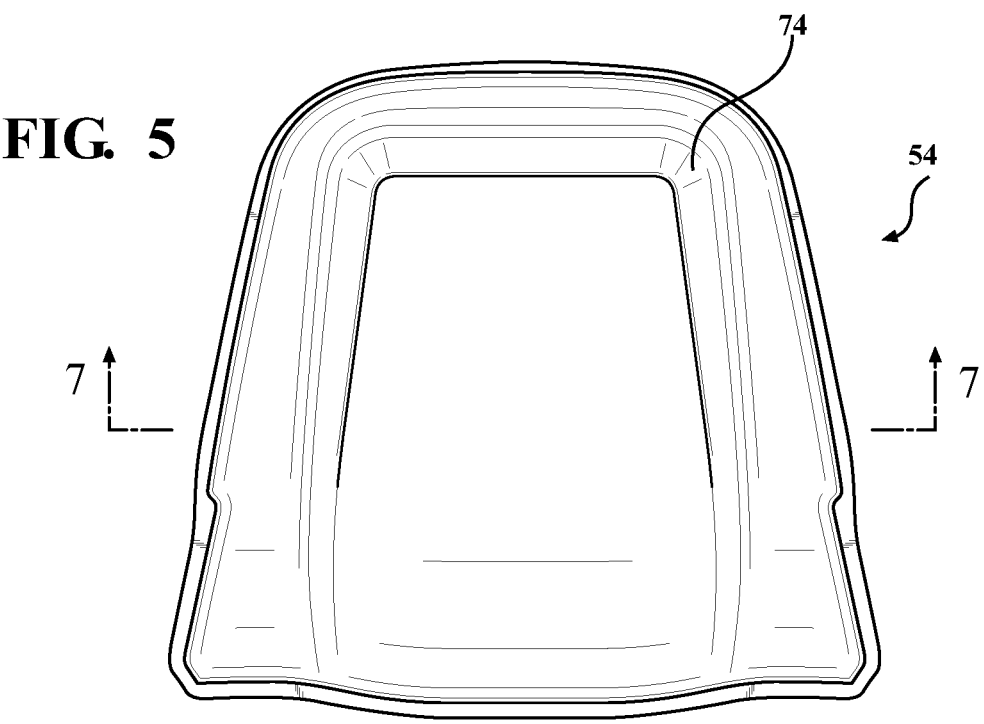

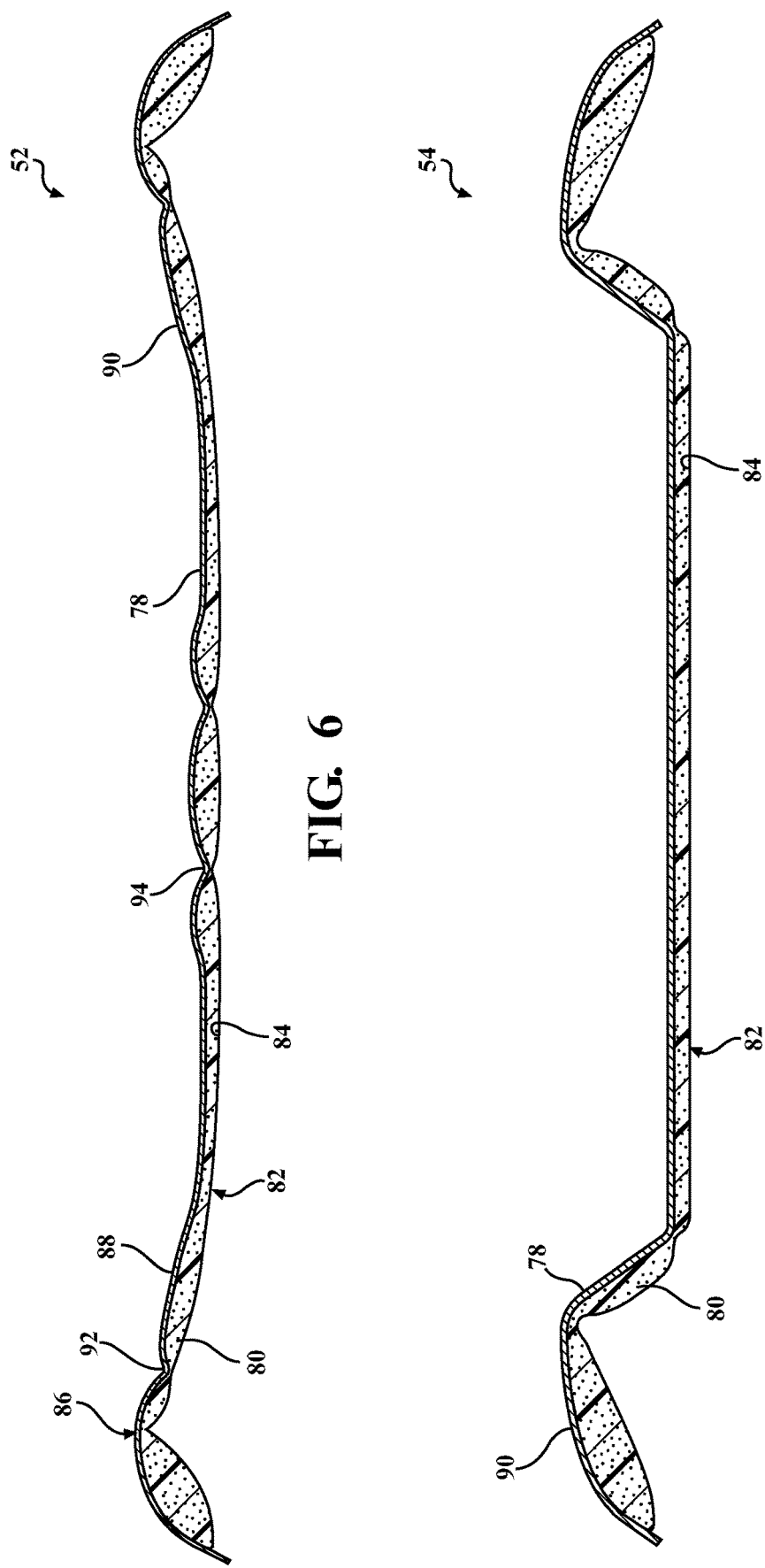

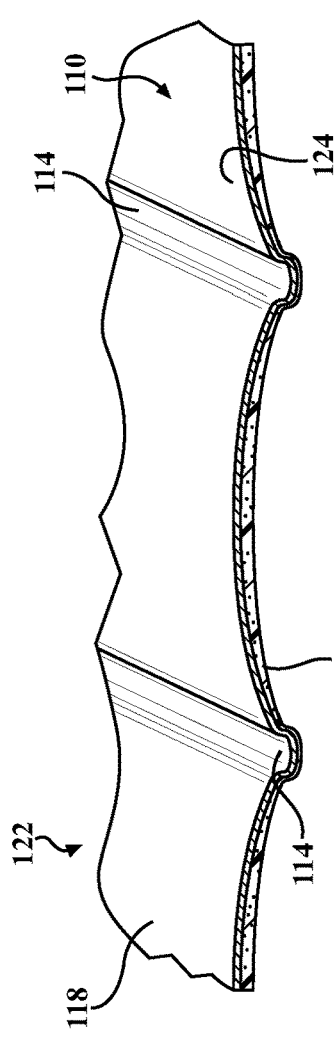
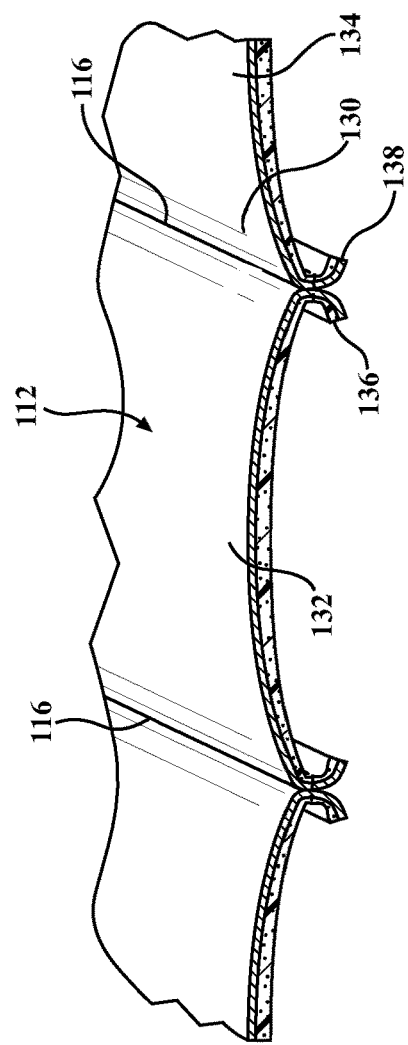
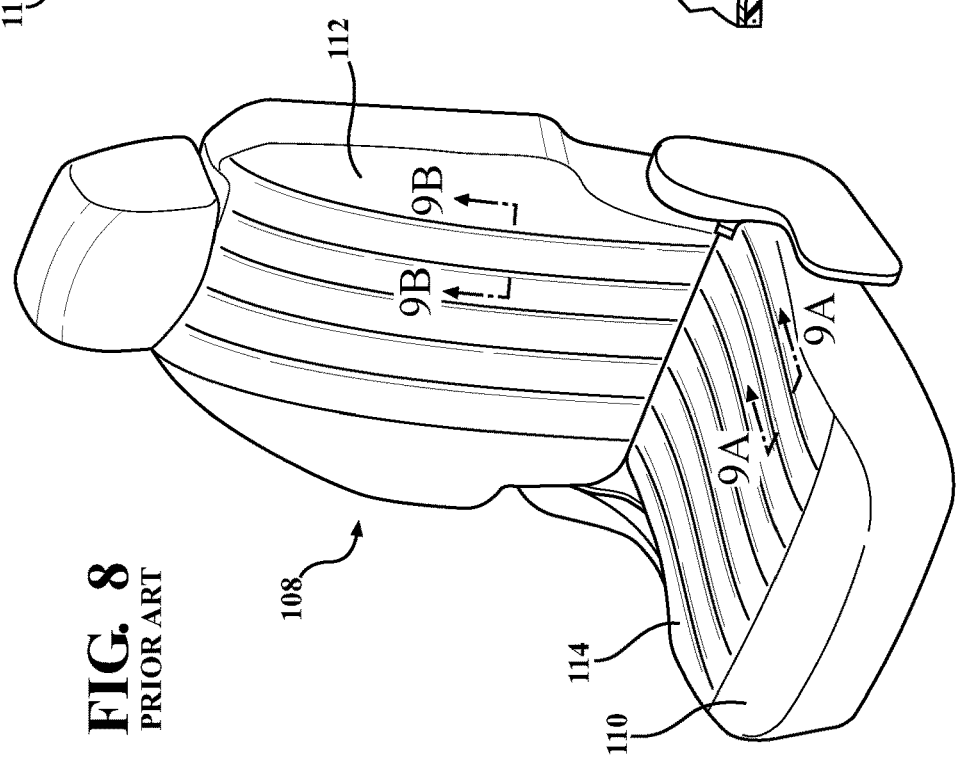

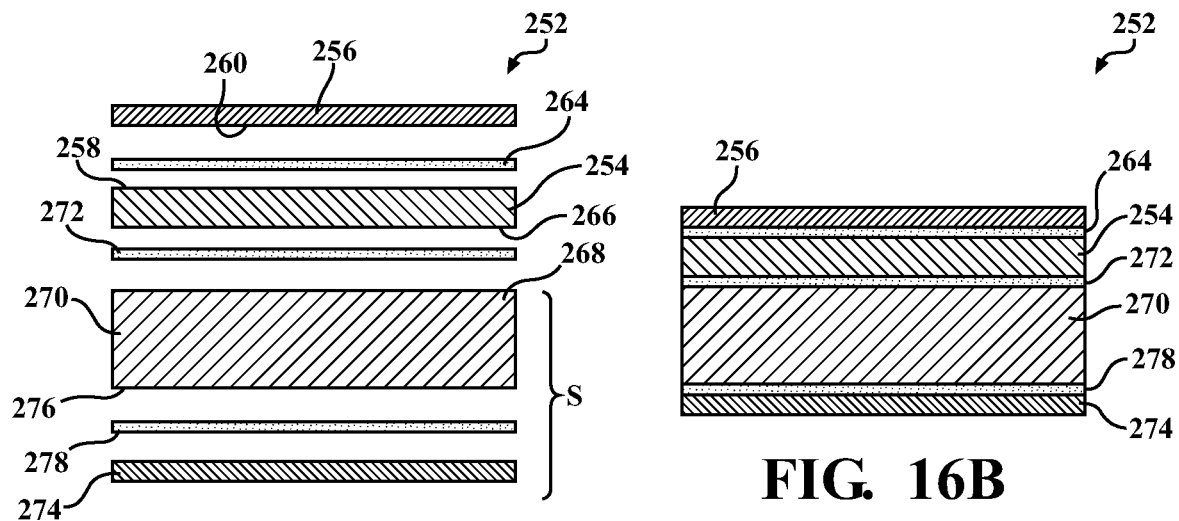
FIG. 16A
FIG. 16B
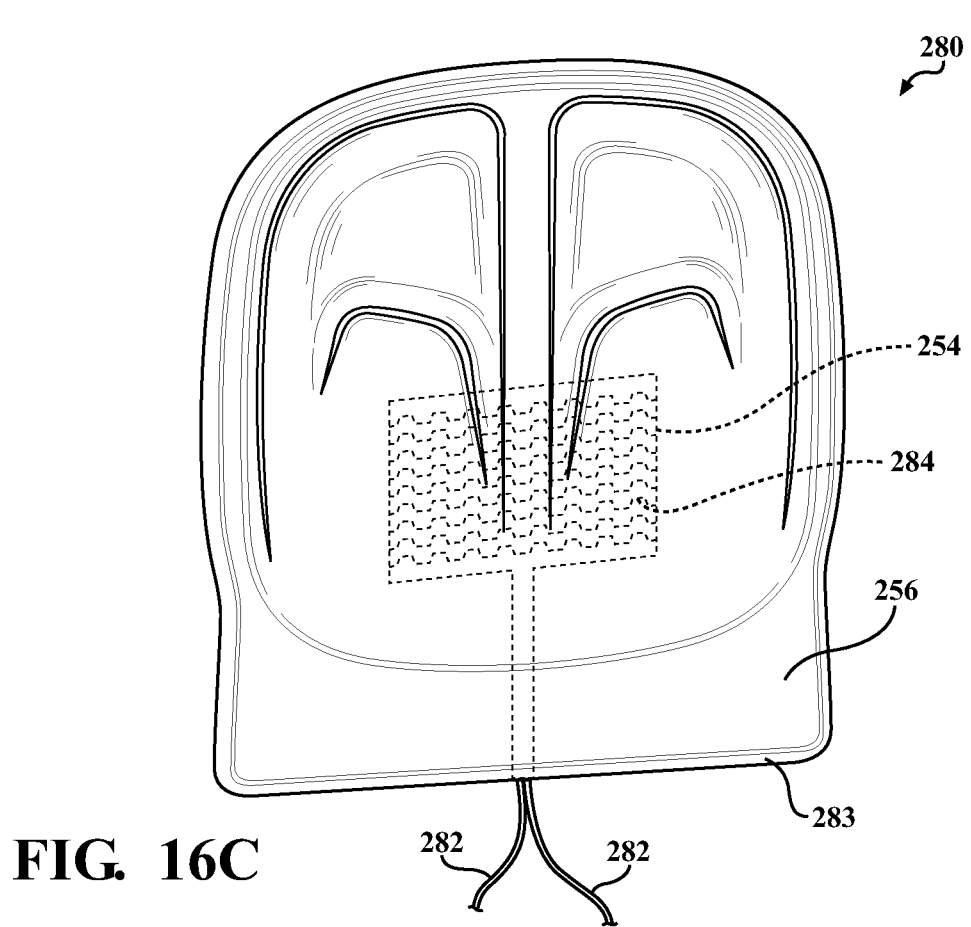
FIG. 16C

FIG. 24
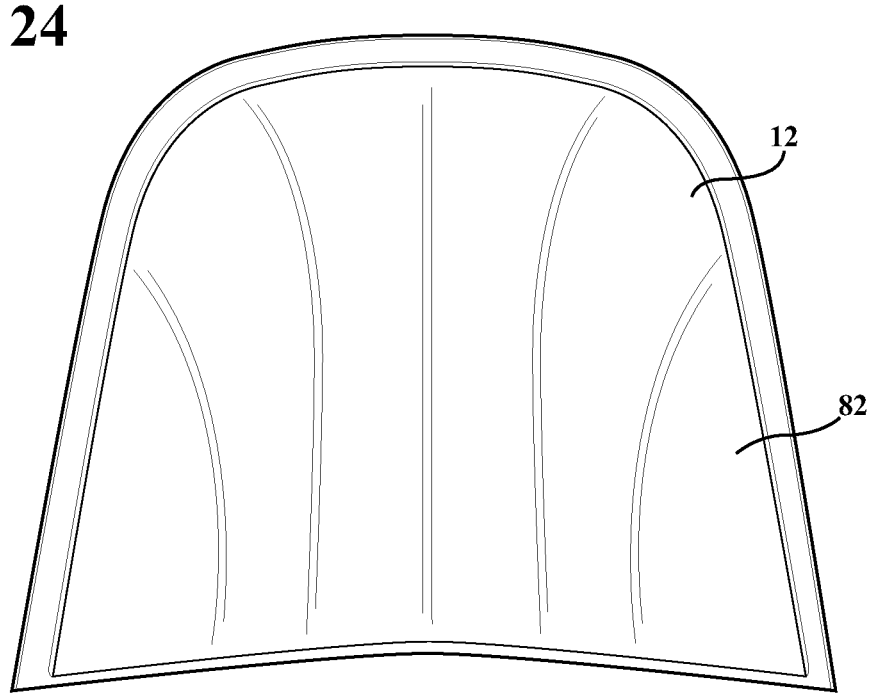
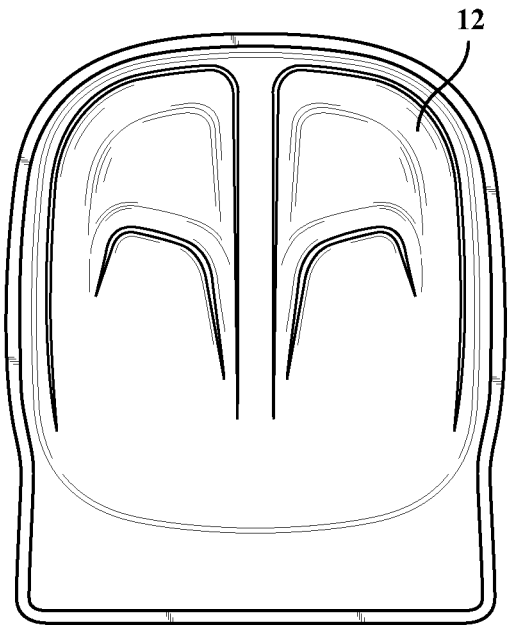
FIG. 25         FIG. 26

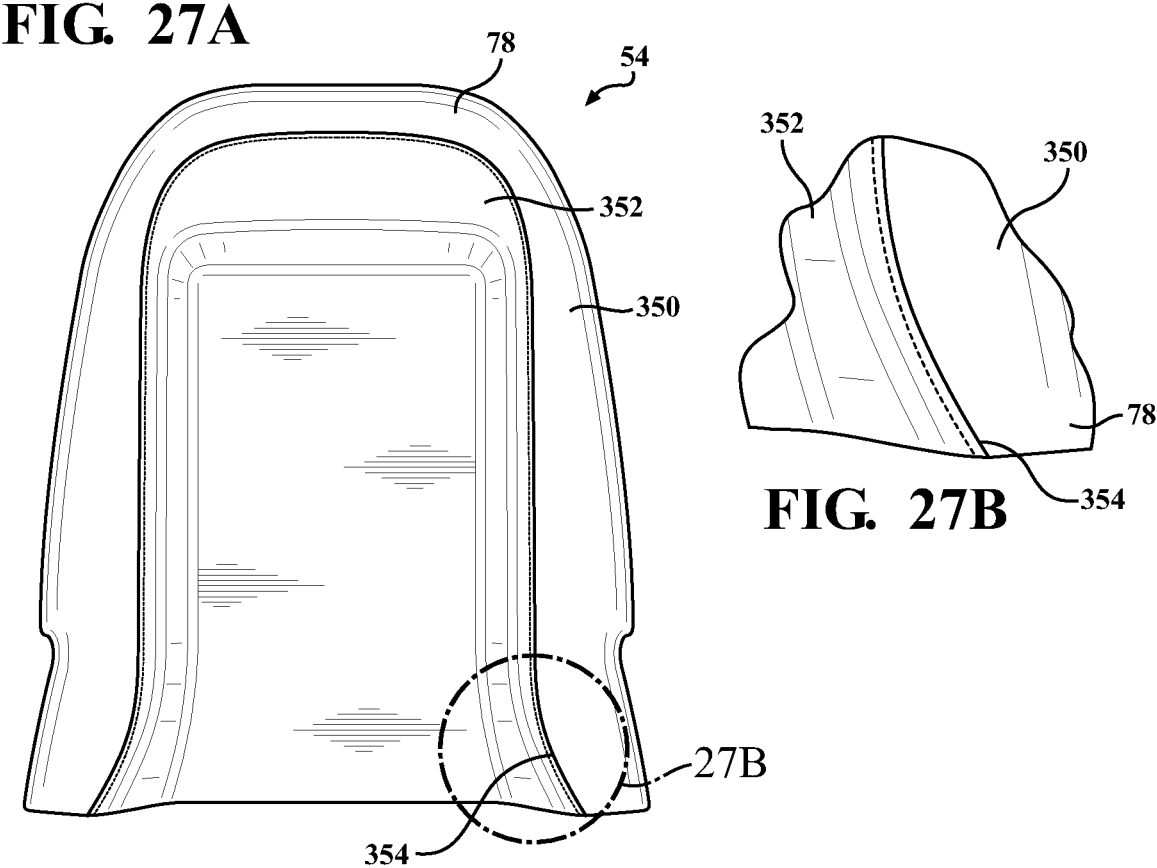
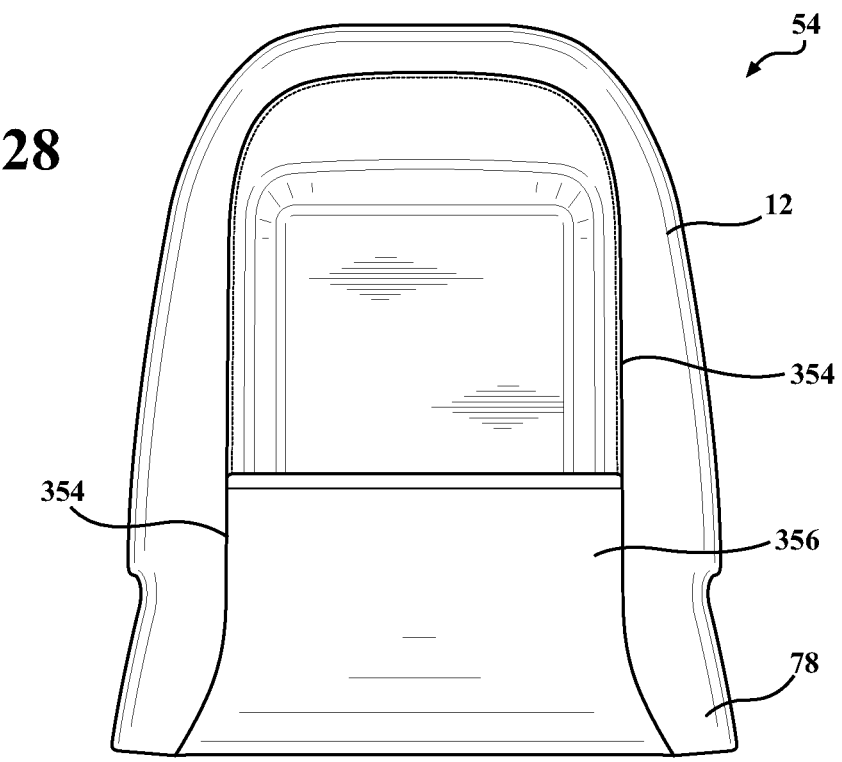

FIG. 29
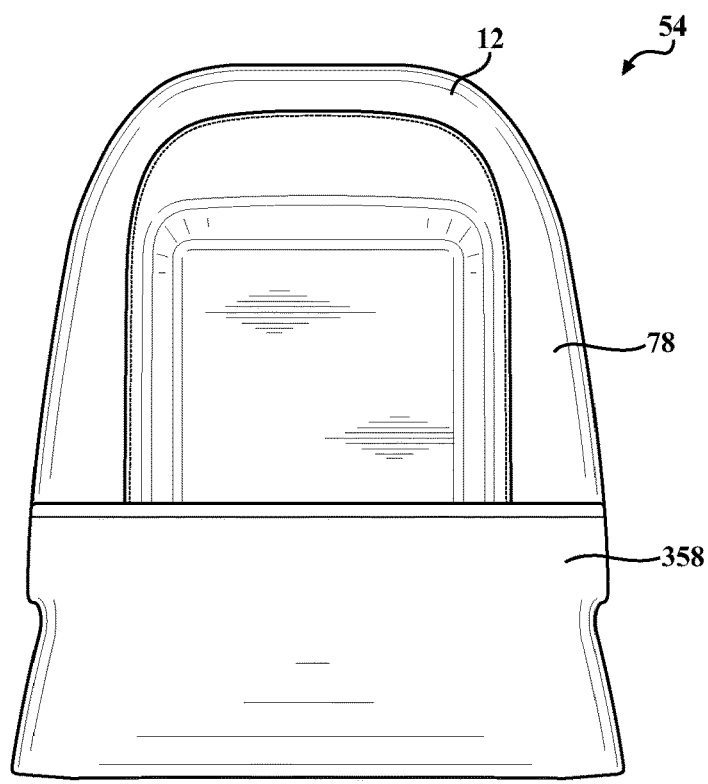
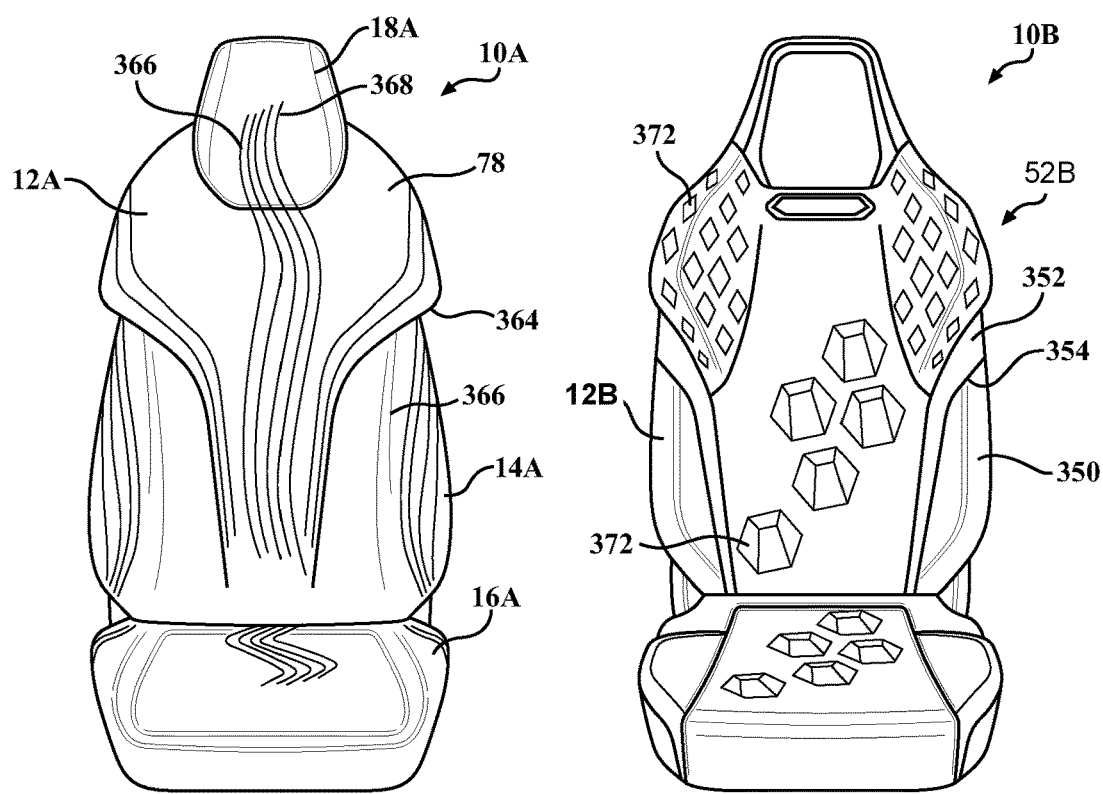
FIG. 30A  FIG. 30B

FIG. 31A
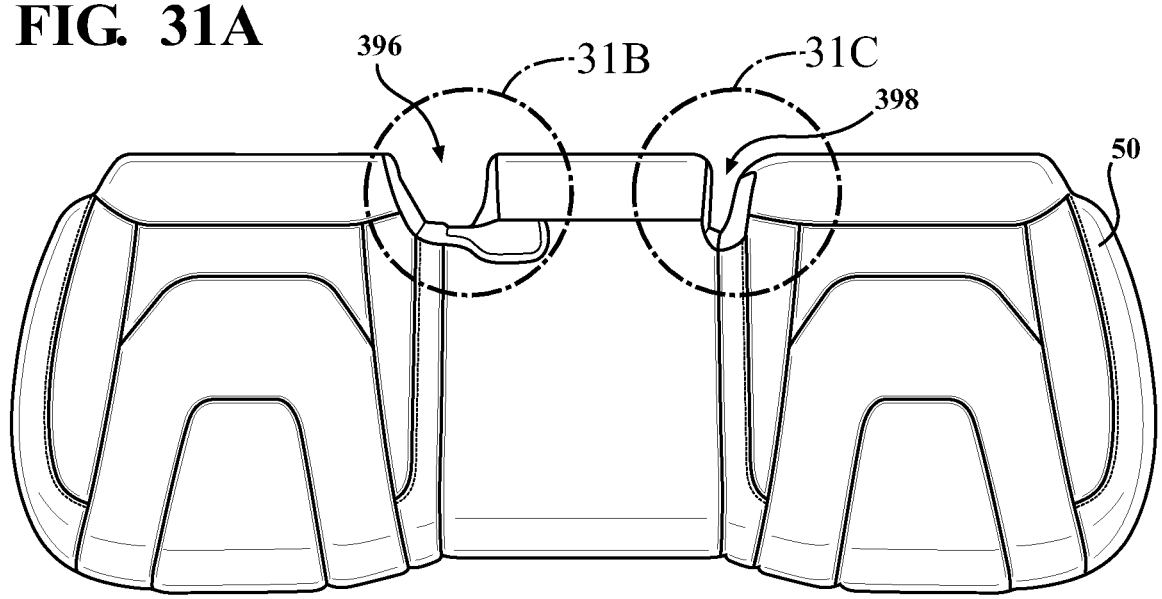
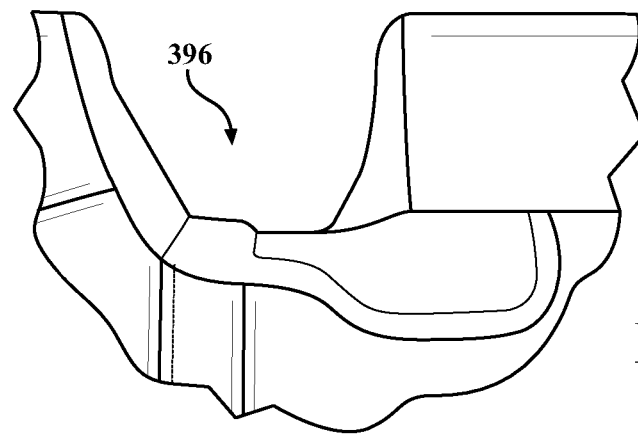
FIG. 31B
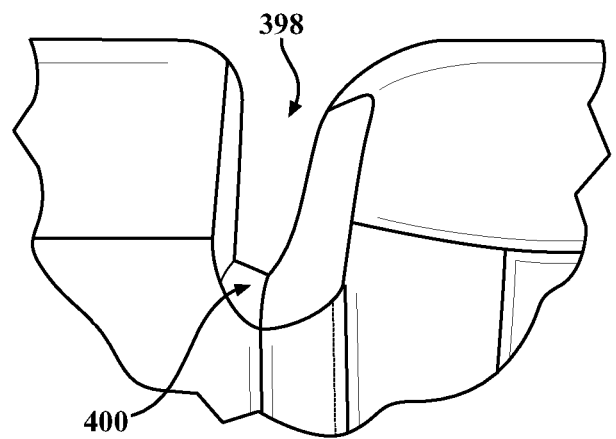
FIG. 31C

PROCESS FOR MOLDING COVER MATERIALS FOR SEATING APPLICATIONS

CROSS-REFERENCE TO RELATED APPLICATIONS

This application claims priority to U.S. Provisional Application No. 62/679,053, filed on Jun. 1, 2018 and to U.S. Provisional Application No. 62/845,928, filed on May 10, 2019.

BACKGROUND OF THE INVENTION

1. Field of the Invention

The present invention relates to a process for molding cover materials and the cover materials formed using this molding process. More particularly, the invention relates to a process for forming 3-dimensional cover materials and automotive seat trim covers formed by this molding process.

2. Description of Related Art

Automotive vehicles typically include one or more seat assemblies having a seat cushion and a seat back for supporting a passenger above a vehicle floor. Generally, each of the seat cushion and seat back comprise a foam pad supported by a frame. A cover is assembled with the foam pad to provide a finished surface. Each of the seat cushion and seat back generally have one or more contoured surfaces and generally require a contoured cover. The contoured cover generally comprises a seating surface portion (referred to hereafter as a trim cover panel or trim cover) fastened and/or sewn to one or more side pieces.

Various processes for forming 3-dimensional automotive seat trim covers are known in the art. One commonly known method for forming a contoured trim cover is to cut pieces of a cover material into desired shapes and sew the pieces together along edges to form the contoured trim cover. This cut-and-sew process can be relatively expensive, time consuming, and difficult depending on the desired degree of contour in the trim cover. Additional material pieces are needed as the desired amount of contour increases. Further, additional seams and sew lines may be needed in the trim cover to obtain a desired style appearance. There is a practical limit to the amount of detail and the amount of contour that can be created with a cut-and-sew trim cover.

Other known methods for forming a contoured trim cover include a variety of molding processes. Molded seating surfaces are desirable for automotive applications because molded seating surfaces have reduced material and labor costs when compared to traditional cut-and-sew trim covers. Further, additional styling and deeper contours can be achieved with molding processes which would be difficult to obtain with cut-and-sew constructions. Finally, molded seating surfaces generally have improved craftmanship and improved cleanability over cut-and-sew construction because the molded seating surface has fewer sew seams.

One known method of molding a trim cover, commonly described as Uni-Trim™, is disclosed in U.S. Pat. No. 4,722,760. The Uni-Trim™ method generally comprises the step of forming a number of spaced apart recessed grooves on the surface of a foam pad, placing a cover material on a lower mold having projections corresponding to the respective recessed grooves in the surface of the foam pad, molding the cover material to have the contour of the lower mold, applying adhesive to the formed cover material, applying the grooved foam pad to the formed cover material, and bonding the formed cover material to the foam pad. This known process may produce more manufacturing scrap than traditional cut-and-sew methods since misbonded covers cannot be reclaimed or reused. In addition, this process may require cover materials with high fiber elongation, which increases the cost of the cover materials while also limiting the selection of suitable materials. Further, warranty costs are higher than other manufacturing methods since the cover material cannot be removed from the foam pad, and thus the entire cover and pad assembly must be replaced when damaged.

Another known method for assembling a trim cover, referred to as SureBond™, is disclosed in U.S. Pat. No. 4,692,199. The SureBond™ method generally comprises applying a thermoplastic adhesive film and a cover material to a formed cellular foam pad and applying superheated steam to diffuse the adhesive layer and permanently bond the cover material to the foam pad. The cover material can be reclaimed when defects occur during the bonding process. However, the cellular foam pad is typically not reclaimed. Using steam to diffuse the adhesive may result in cover material distortion and alter the shape of the cellular foam pad. Superheated steam can distort the nap in a fabric cover material during the bonding process. When the cover material and the cellular foam pad are not fully bonded, unbonded adhesive film can give off annoying crinkle "sounds" in a finished automotive seat. Warranty costs of SureBond™ covers are elevated over other known methods since the entire trim cover and foam pad must be replaced if there are any issues with either the cellular foam pad or the cover material.

An alternate known method of bonding a trim cover to a foam pad is disclosed in U.S. Pat. No. 5,231,746 and is commonly referred to as PureFit™. The PureFit™ process generally comprises the steps of sewing a front fabric panel and a back fabric panel together with the exterior surfaces of the front and back panels facing one another to form a bag-like structure, sliding the bag-like structure onto a tongue-like mold, placing an air impermeable barrier film on the interior surface of the front panel and applying a vacuum to form the front panel around the tongue-like mold, contacting the front panel with a mold surface of the tongue-like mold, forming a body of foam material on the interior surface of the front panel, and inverting the bag-like structure such that the foam material is positioned within the bag-like structure. This known PureFit™ method has a high tooling cost. Further, improperly formed seat back covers cannot be reworked and the entire molded cover/foam assembly is scrapped. Also, the molded seat back cover is non-breathable since a barrier film is required for the vacuum-form process step. Airflow through the foam is restricted by the barrier film, which can cause moisture to build up between the automotive seat and an occupant of the seat.

A generally known method of forming a seat upholstery panel, referred to as Cover Carving Technology™ (CCT), is disclosed in U.S. Pat. No. 8,794,708. The CCT method generally comprises the steps of spraying a cellular foam on a polypropylene substrate to form a coated substrate, attaching the coated substrate to a reverse side of a textile material in a press comprising a die and punch, and actuating the press to impart a visible shape in the foam bonded with the textile material while the foam is in a viscous state. A resulting seat upholstery panel typically has little or no airflow through the panel since the cellular foam is sprayed onto a polypropylene sheet.

Another known compression molding process developed by Actex, Inc. is disclosed in U.S. Pat. No. 4,867,826. The Actex method generally comprises the steps of applying a heat-curable urethane adhesive to one surface of a compressible polyurethane foam layer, directly contacting the adhesive-bearing surface of the foam layer with a layer of cover material to form a bilayer, placing the bilayer on a platen, contacting the cover material layer of the bilayer with at least one heated projection of a mold tool at a temperature from about 300° F. to about 480° F. (about 150° C. to about 250° C.), compressing regions of the foam layer adjacent the heated projection, melting and collapsing the compressed regions of the foam layer using the heat of the projection for a period from about 30 to about 90 seconds to form permanent embossed lines in the bilayer, and removing the projections from the bilayer, and solidifying the melted collapsed regions of the foam layer. As generally described, the laminated foam article is compression molded against a flat lower surface, i.e., contours are molded into the foam layer by heated projections pressing into an upper surface of the foam layer. While the relatively high molding temperature of about 300° F. to about 480° F. allows for a processing time of about 30 to about 90 seconds as well as curing the urethane adhesive, this molding temperature range limits the choice of suitable fabrics. Also, since the foam article is compression-molded while maintaining a generally flat lower surface of the foam layer (commonly described as a 2-dimensional molding process), the foam article must be bent to take on a desired shape for assembly into an automotive seat which can create cracking and wrinkling in the finished seat. Warranty costs of Actex foam articles are similarly elevated over other known methods since the entire trim cover and foam layer must be replaced if there are any issues with either the foam layer or cover material.

It is desirable, therefore, to form an automotive seat trim cover having a 3-dimensional shape with up to about 4 inches of localized contour for the seat surface. Further, it is desirable to have a seat trim cover that is releasably attached to a seat foam pad. Also, it is desirable to minimize the amount of required bending of the trim cover when it is assembled to an automotive seat. In addition, it is desirable to have a seat trim cover with a smooth, seamless styling surface with hidden tie downs. Furthermore, it is also desirable to form seat trim covers with increased contours and/or detailed shapes to deliver a styled appearance that is not normally achievable with traditional cut-and-sew designs. Additionally, it is desirable to integrate secondary features, such as electronic sensors and/or seat heaters, to the seat trim cover as part of the molding process. Likewise, it is desirable to mold other types of surface covers for automotive interiors and household products. Finally, it is desirable to provide seat trim covers with improved breathability over other molded trim technologies and comparable thermal comfort to traditional cut-and-sew trim covers.

SUMMARY OF THE INVENTION

A seat trim cover for an automotive seat is formed into a 3-dimensional shape by compression molding a laminated moldable foam in a 3-dimensional mold. The laminated moldable foam comprises at least a layer of cellular polyurethane foam compression moldable in a temperature range of about 220° F. to about 260° F. The 3-dimensional mold is heated to a temperature range of about 150° F. to about 320° F. The layer of cellular foam is adhered to a cover material layer and precut into a pre-laminated blank prior to molding into the 3-dimensional shape. Optionally, seat heaters or other components can be integrated with the laminated foam prior to compression molding the seat trim cover.

BRIEF DESCRIPTION OF THE DRAWINGS

Advantages of the present invention will be readily appreciated as the same becomes better understood by reference to the following detailed description when considered in connection with the accompanying drawings wherein:

FIG. 1 illustrates a front perspective view of a vehicle seat having a molded seat back trim cover and a molded seat cushion trim cover according to an embodiment of the present invention;

FIG. 2 illustrates a rear perspective view of the vehicle seat of FIG. 1 having a molded back panel trim cover according to an embodiment of the present invention;

FIG. 4 illustrates a front view of the molded seat back trim cover of FIG. 1 according to an embodiment of the present invention;

FIG. 5 illustrates a rear view of the molded back panel trim cover of FIG. 2 according to an embodiment of the present invention;

FIG. 6 illustrates a cross-sectional view of the molded seat back trim cover of FIG. 4 taken along section line 6-6 shown in FIG. 4 according to an embodiment of the present invention;

FIG. 7 illustrates a cross-sectional view of the molded back panel trim cover of FIG. 5 taken along section line 7-7 shown in FIG. 5 according to an embodiment of the present invention;

FIG. 8 illustrates a perspective view of a prior art vehicle seat;

FIG. 9A illustrates a cross-sectional view of a portion of the prior art trim cover of FIG. 8 taken along section line 9A-9A shown in FIG. 8;

FIG. 9B illustrates a cross-sectional view of a portion of the prior art trim cover of FIG. 8 taken along section line 9B-9B shown in FIG. 8;

FIGS. 16A and 16B are schematic views of a first embodiment of a laminate blank having a heating element according to embodiments of the present invention;

FIG. 16C is a perspective view of a molded seat back trim cover having an integrated seat heater according to another embodiment of the present invention;

FIG. 24 illustrates a bottom view a molded seat trim cover according to an embodiment of the present invention;

FIG. 25 illustrates a top view of a molded seat trim cover according to an embodiment of the present invention;

FIG. 26 illustrates a top view of the molded seat trim cover of FIG. 25 after exposure to environmental aging according to an embodiment of the present invention;

FIG. 27A illustrates a rear view of a molded seat back panel having a sew seam between two materials prior to a molding process according to another embodiment of the present invention;

FIG. 27B illustrates a partial rear view of the molded seat back panel of FIG. 27A according to another embodiment of the present invention;

FIG. 28 illustrates a rear view of a molded seat back panel with an integrated pocket according to another embodiment of the present invention;

FIG. 29 illustrates a rear view of a molded seat back panel with a full width pocket according to another embodiment of the present invention;

FIGS. 30A-E illustrate front views of vehicle seats according to embodiments of the present invention;

FIG. 31A illustrates a top view of a vehicle seat having molded buckle pockets according to another embodiment of the present invention; and FIGS. 31B and 31C illustrate partial top views of the molded buckle pockets of FIG. 31A according to another embodiment of the present invention.

DETAILED DESCRIPTION OF THE EMBODIMENTS

FIGS. 1-7 and 13-31C illustrate molded vehicle seat trim covers and/or trim components, vehicle seats having molded trim covers and/or trim components, and a process for manufacturing the seat trim covers and/or trim components according to embodiments described herein. Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. Further, the Figures are not necessarily shown to scale. Referring to the Figures, like numerals indicate like or corresponding parts throughout the several views.

Figure 3:
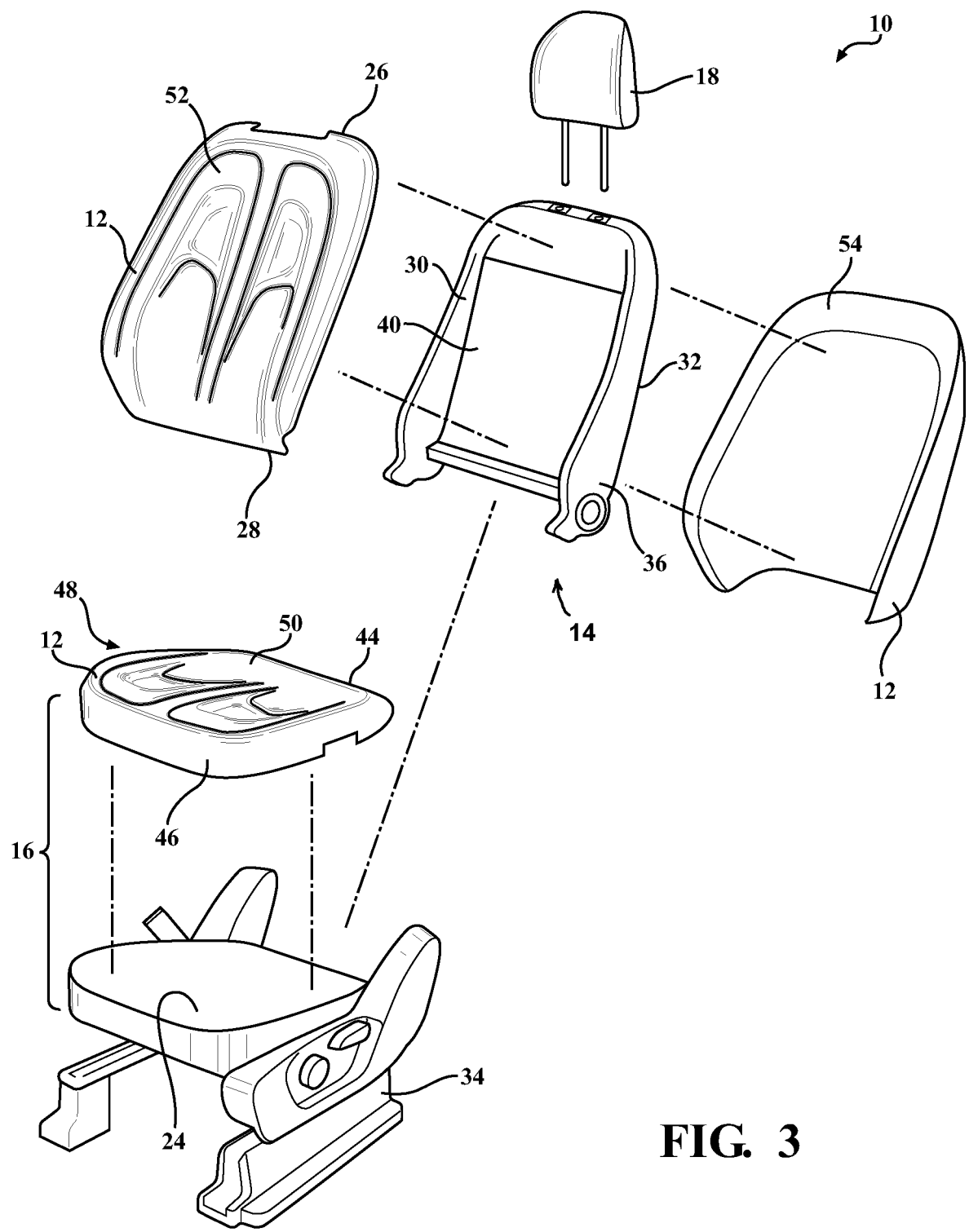
FIG. 3 illustrates an exploded view of the vehicle seat of FIG. 1 according to an embodiment of the present invention.

FIGS. 1 and 2 illustrate perspective views of a vehicle seat assembly 10 having FreeForm™ molded trim covers 12 according to an embodiment of the present invention. Trim covers 12 and other components assembled and compression molded by way of a process disclosed herein are optionally described as FreeForm™ components. The vehicle seat assembly 10 has a seat back 14 rotatably connected to a seat cushion 16 and a head restraint 18 coupled with the seat back 14 as is commonly known in the art. The seat cushion 16 extends between a front end 20 and an opposite rear end 22 adjacent the seat back 14. The seat cushion 16 comprises a base foam pad 24 as well as other optional components. The seat back 14 extends between a top end 26 and an opposite bottom end 28 adjacent the rear end 22 of the seat cushion 16. The seat back 14 includes a front surface 30 and a back surface 32. The seat back 14 comprises a base foam pad 40 as well as other optional components. As shown in FIG. 3, each of the seat cushion 16 and the seat back 14 includes a frame 34, 36 for supporting a molded base foam pad 24, 40. The seat cushion 16 and the front and rear surfaces 30, 32 of the seat back 14 are encased in molded trim covers 12 and other optional trim components. Each trim cover 12 comprises a molded trim component 44 optionally sewn or assembled with one or more side pieces 46 to form a trim cover assembly 48. A seat cushion trim cover 50 is assembled with the base foam pad 24 to form the seat cushion 16. A seat back trim cover 52 and a seat back panel 54 are assembled with the base foam pad 40 to form the seat back 14 as shown in FIG. 3.

The present invention relates to molded trim covers for vehicle seats. More specifically, the disclosed molded seat trim covers have an improved appearance, a reduction in required sew seams, and improved breathability over traditional molded trim covers.

The FreeForm™ molded seat back trim cover 52 and the FreeForm™ molded seat back panel 54 are shown in FIGS. 4 and 5, respectively, and illustrate molded features 70, molded lines 72 having the appearance of sew seams, surface concavity 74, and a 3-dimensional shape. Cross-sectional views of the seat back trim cover 52 and the seat back panel 54 are shown in FIGS. 6 and 7, respectively. Both the seat back trim cover 52 and the seat back panel 54 include at least a cover material layer 78 adhered to a moldable foam interlayer 80. Optionally, a scrim backing layer 82, typically a woven or non-woven fabric, is adhered to a lower side 84 of the foam interlayer 80. The cover material layer 78 comprises one or more of a fabric, vinyl, and/or leather. Optionally, while not clearly shown in FIG. 6, each seat back trim cover 52 may have additional layers such as adhesives, spacer materials, and/or functional elements, such as embedded electronics and/or seat heaters. It will be appreciated that a variety of materials can be incorporated into the seat back trim cover 52 prior to molding as suitable or desired for an intended application. It will also be appreciated that the layering construction options of the seat back trim cover 52 and seat back panel 54 also apply to the seat cushion trim cover 50.

The molded trim covers and back panels 50, 52, 54 optionally have portions with sharply curved inclined surfaces 86 and/or gradual tapers 88 in their surface contours. As generally shown in FIGS. 6 and 7, the localized amount and change in slope in an upper surface 90 of the trim covers and back panels 50, 52, 54 results in the appearance of deep "strong" mold lines 92, shallow "weak" mold lines 94, surface concavity, and/or localized curvature providing a 3-dimensional shape. During the molding process described below, the trim covers and back panels 50, 52, 54 are molded into a final shape that is generally retained after they are removed from mold tools 96 (shown in FIG. 18). The 3-dimensional shape is primarily created by compression molding the moldable foam interlayer 80 between 3-dimensional upper and lower mold tools 98, 100 (shown in FIG. 18). The mold tools 96 are heated to a range of about 150° F. to about 320° F. to create a temperature gradient to the foam interlayer 80. The foam interlayer 80 is moldable in a temperature range of about 220° F. to about 260° F. The general shape of the trim covers and back panels 50, 52, 54 are maintained even if they are flexed, i.e., the trim covers and back panels 50, 52, 54 generally return to the molded shape when they are unrestrained.

In comparison, commonly known methods of trim cover construction include known molded trim technologies and traditional cut-and-sew construction. FIG. 8 illustrates a generally known automotive seat 108 having exemplary trim covers 110, 112 with generally known compression molded seams 114 as well as generally known cut-and-sew seams 116. The generally known compression molded seams 114, shown in FIGS. 8 and 9A, are obtained by applying a cover material 118 and adhesive (not shown) to a foam layer 120 to form a cover/foam assembly 122 which is compression molded at high temperatures, about 300° F. to about 480° F. (about 150° C. to about 250° C.), to form the appearance of seams in the exemplary trim cover 110. A partial cross-sectional view of the exemplary seat trim cover 110 is shown in FIG. 9A illustrating the appearance of the molded seams 114. The resulting molded seams 114 are typically uniform in appearance with minimal contour in the resulting upper surface 124 of trim cover 110. Further, the resulting trim cover 110 is typically stiff and has little or no breathability. The exemplary known trim cover 110 is generally formed in a 2-dimensional tool and is bent to take on a desired 3-dimensional shape, which may result in wrinkles in the trim cover 110. Finally, the choice of cover materials is limited since the compression molding is done at high temperatures in the range of about 300° F. to about 480° F.

A partial cross-sectional view of the exemplary seat trim cover 112 is shown in FIG. 9B illustrating the appearance of cut-and-sew seams 116. The resulting cut-and-sew seams 116 are typically uniform in appearance with minimal contour in the resulting upper surface 130 of trim cover 112. Traditional cut-and-sew trim covers 112 require pieces of material 132, 134 to be cut into shapes and edges 136, 138 of the cut pieces 132, 134 to be sewn together to create the overall cut-and-sew trim cover 112, such as illustrated in FIGS. 8 and 9B. The cut-and-sew trim cover 112 is expensive since a number of material pieces 132, 134 have to be cut and sewn together. Further, the cost and complexity of the cut-and-sew trim cover 112 is increased when additional design details are added such as surface contour and/or seams 116.

Figure 10:
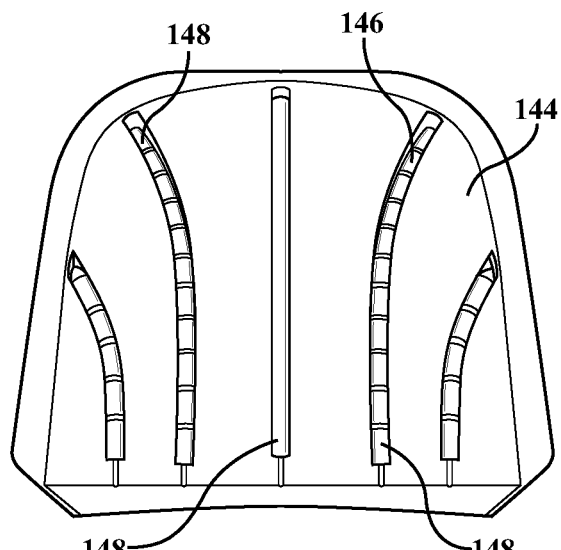
FIG. 10 illustrates typical seat cover hook fasteners insert-molded into a prior art base foam pad.
Figure 11:
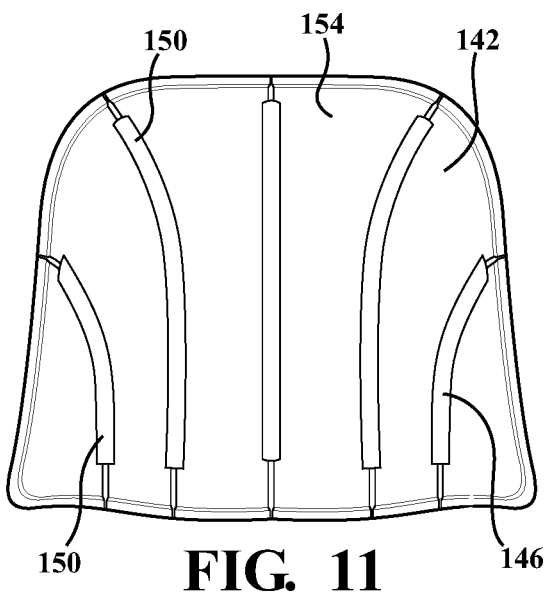
FIG. 11 illustrates prior art seat cover loop fasteners sewn to a prior art cut-and-sew trim cover.

Referring to FIGS. 10 and 11, a seat trim cover 142 is generally attached to a base foam pad 144 using fasteners 146. The base foam pad 144, shown in FIG. 10, includes a plurality of hook fasteners 148. The seat trim cover 142 has a plurality of loop fasteners 150 attached to a lower surface 154 of the trim cover 142 as illustrated in FIG. 11. During assembly, the loop fasteners 150 on the lower surface 154 are aligned with and connected to the hook fasteners 148 on the base foam pad 144. Generally, the number of fasteners 146 required increases as the desired contour of the trim cover 142 increases. One known method to minimize fasteners is to permanently adhere the trim cover 142 to the base foam pad 144. Another known method is to form the trim cover 142 and foam base pad 144 as one unit. However, it is desirable to have a removable trim cover 142 so that the trim cover 142 can be replaced if desired.

Figure 12:
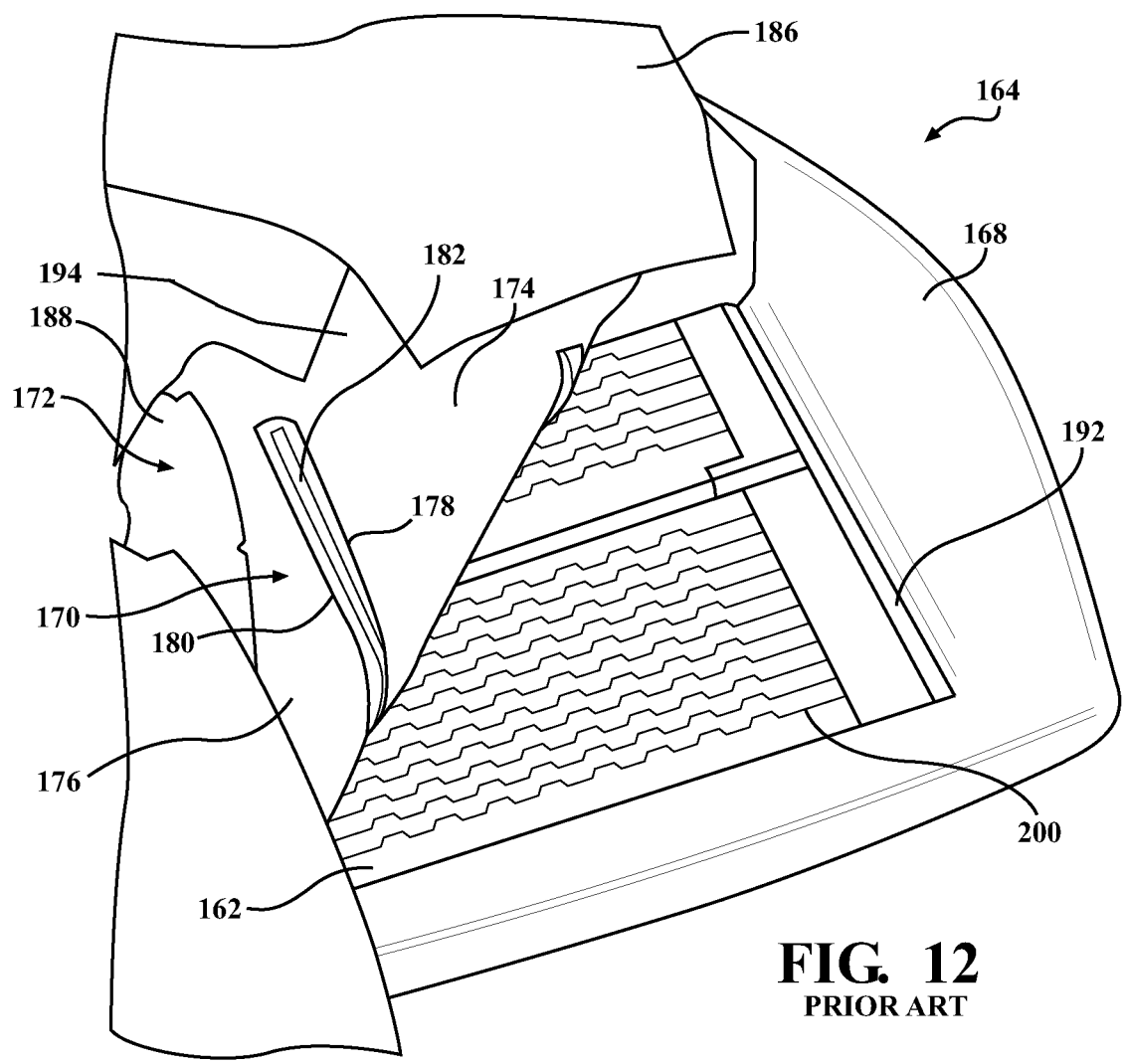
FIG. 12 illustrates a partially disassembled perspective view of a portion of a prior art seat having an integrated seat heater.

Seat heaters 162 are often installed in automotive seat cushions and/or seat backs. A partially disassembled view of a typical automotive seat cushion assembly 164 is illustrated in FIG. 12. The typical seat cushion assembly 164 includes the seat heater 162, a base cellular foam pad 168, and a seat trim cover assembly 170. The seat trim cover assembly 170 comprises a trim cover 172 having a plurality of cover pieces 174, 176. Adjacent cover pieces 174, 176 are sewn together along edges 178, 180 of the cover pieces 174, 176 to form sew seams 182. The cover pieces 174, 176 comprise a cover material layer 186 and a padding layer 188. The seat heater 162 typically lays underneath the trim cover 172 and is adhesively bonded to the base foam pad 168. Also illustrated are hook fasteners 192 attached to the base foam pad 168 and loop fasteners 194 attached to the trim cover 172 for removable attaching the trim cover 172 to the base foam pad 168.

Seat heaters 162 are generally evaluated based on the time-to-first sensation (of heat) for the seat occupant and the power consumption of the seat heater 162 design. Most commonly known seat heaters 162 have a time-to-first sensation of about 30 to about 60 seconds and a power consumption of about 60 to about 90 watts. Time-to-first sensation is generally affected by the thickness of the trim cover 172, the density of the foams and textiles in the trim cover 172, and the power density/consumption of the seat heater 162 design.

Having a thick, plush seat trim cover 172 is very desirable for occupant comfort. Initial softness of the cover material layer 186 provides a positive comfort stimulus to the occupant. Initial softness is a function of the trim cover 172 hardness and thickness. Generally, a seat design having substantial softness/plushness will generally be quite thick. Plushness can also be accomplished through softening of the trim cover 172 materials. Since the seat heater 162 is adhered to the base foam pad 168 underneath the trim cover 172, thicker trim covers 172 have poorer heat transfer and a longer time-to-first sensation for the occupant when compared to thinner trim covers 172.

Making the trim cover 172 softer will allow the weight of the occupant to penetrate deeper into the seat cushion assembly 164 and get physically closer to the heating elements 200 of seat heater 162. However, excessively soft trim covers 172 can lead to wrinkling on the cover material layer 186 over time and deteriorate the craftsmanship and appearance of the seat cushion assembly 164.

Instead of making the trim cover 172 softer to improve time-to-first sensation, the power density of the heating elements 200 of the seat heater 162 can be increased to output more heat to overcome the thickness of the trim cover 172. However, there are practical limits to amount of power consumption a seat heater 162 can safely consume. Typical seat heaters 162 consume approximately 60 watts of energy, and high-performance seat heaters 162 consume around 90 watts of energy. It is generally desirable to limit the seat heater 162 power consumption to 90 watts or less of energy. Certain automotive seat cushion assembly 164 requirements restrict the seat heater 162 power usage to 90 watts or less.

The seat heater 162 can be moved closer to the occupant by making the trim cover 172 thinner, which improves the seat heater 162 performance. However, thin trim covers 172 can be less comfortable and feel less plush than desired by the occupant. Thus, plushness and occupant comfort are in direct conflict to seat heater 162 performance and time-to-first sensation. A better alternative, which will be described below, is to integrate the seat heater 162 into the trim cover 12 instead of attaching the seat heater 162 to the base foam pad 168.

The disclosed FreeForm™ trim covers 12 and components overcome some of these limitations with the known seat covers when manufactured with the following process. The FreeForm™ trim covers 12 and the process for forming these trim covers 12, according to embodiments of the present disclosure, are described below and illustrated in FIGS. 13-21.

A process for molding FreeForm™ trim covers 12 from preformed laminate blanks 210, according to embodiments of the present invention, is illustrated in FIGS. 13-21. Generally, this process comprises the steps of 1) assembling a laminate blank 210, 2) placing the laminate blank 210 in a 3-dimensional compression mold tool 96, 3) molding the laminate blank 210, at a mold tool temperature of about 150° F. to about 320° F., and at a mold tool pressure of about 150 psi to about 250 psi, to form a 3-dimensional shaped molded trim cover 12, and 4) removing the trim cover 12 from the mold tool 96. It will be appreciated that the disclosed process may include more or less processing steps, as well as a different sequence of steps, as desired for a specific intended application or manufacturing process.

Figure 13:
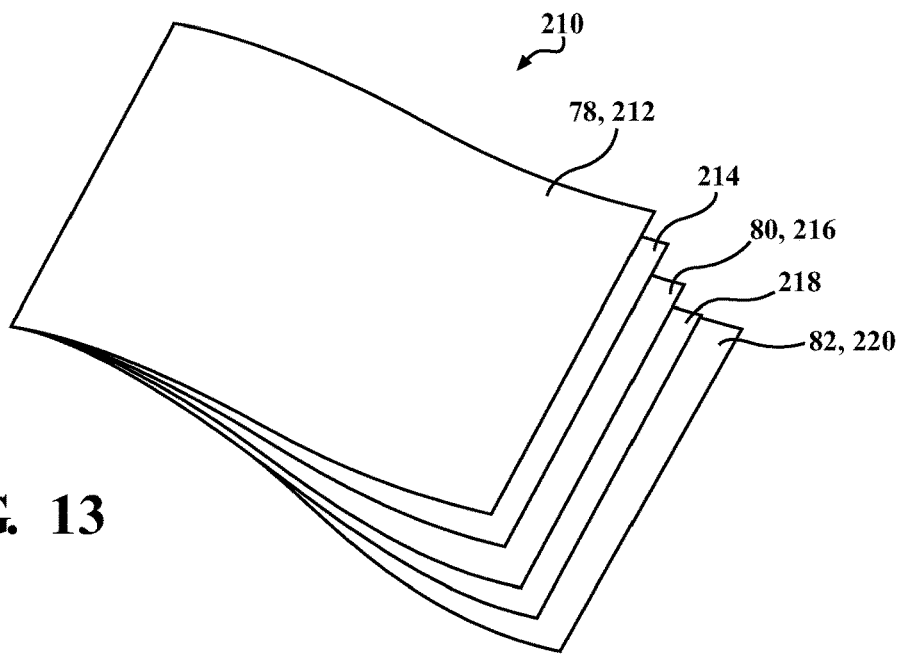
FIG. 13 illustrates an expanded view of a molded trilaminate construction according to an embodiment of the present invention.
Figure 14:
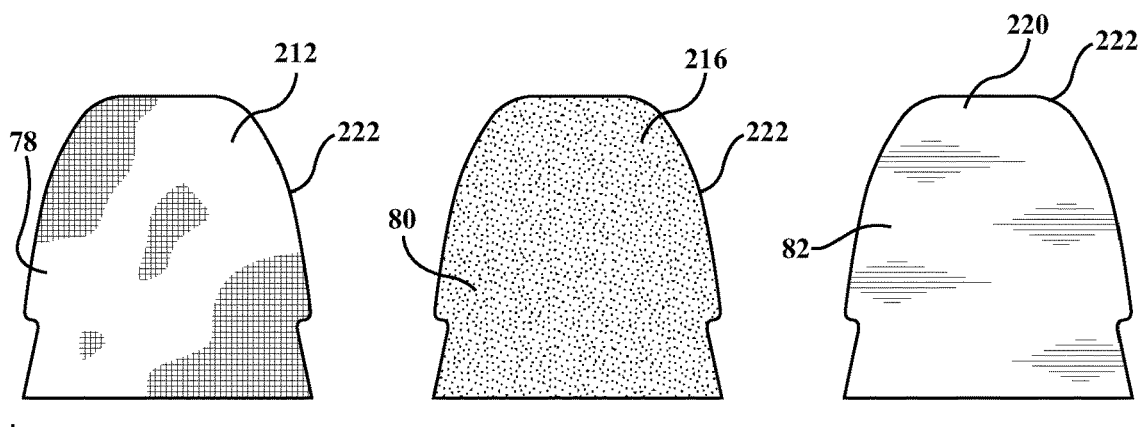
FIG. 14 illustrates a top view of a cover material blank, a moldable foam interlayer blank, and a non-woven scrim backing blank according to an embodiment of the present invention.

Referring to FIG. 13, the laminate blank 210 comprises an assembly of the cover material layer 78, a first adhesive layer 214, the moldable foam interlayer 80, a second adhesive layer 218, and the scrim backing layer 82. The cover material layer 78, moldable foam interlayer 80, and the scrim backing layer 82 can be described as a cover material blank 212, a foam interlayer blank 216, and a scrim backing blank 220, respectively, when cut into a desired blank shape 222 as illustrated in FIG. 14.

Figure 15:
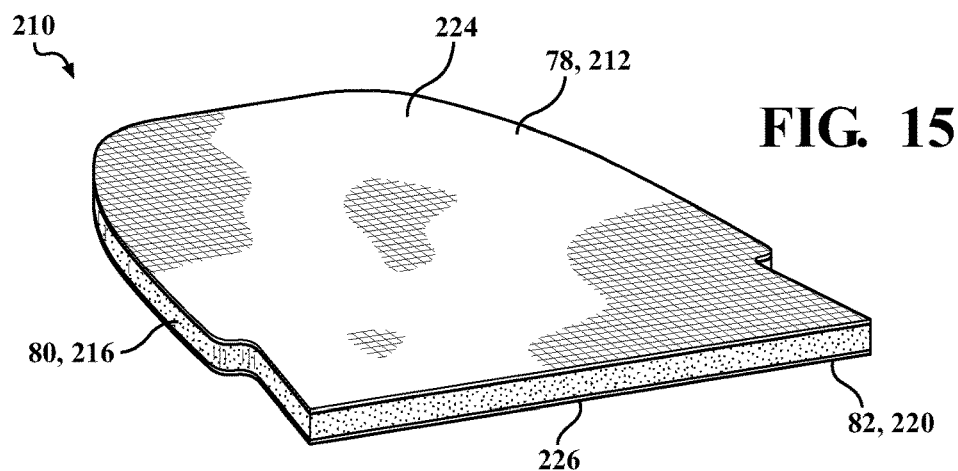
FIG. 15 illustrates a perspective view of a portion of a trilaminate assembly [laminate blank] of the cover material layer, moldable foam interlayer, and the non-woven scrim backing layer of FIG. 13 according to an embodiment of the present invention.

FIG. 15 shows a perspective view of the assembled laminate blank 210. Generally, the description of cover material layer 78 and cover material blank 212 are used interchangeably. Likewise, the description of moldable foam interlayer 80 and scrim backing layer 82 are described interchangeably as foam interlayer blank 216 and scrim backing blank 220, respectively. It will be appreciated that the phrases "cover material layer" 78 and "cover material blank" 212 may be used interchangeably for purposes of this disclosure. In a similar fashion, the phrases "foam interlayer" 80 and "scrim backing layer" 82 may be used interchangeably with "foam interlayer blank" 216 and "scrim backing blank" 220, respectively. Further, it will be appreciated that the cover material blank 212, the moldable foam interlayer blank 216, and the scrim backing blank 220 can be precut into a desired blank shape 222 prior to assembling into the laminate blank 210. Alternatively, the cover material layer 212, the moldable foam interlayer 216, and optionally, the scrim backing layer 220 can be assembled and adhered into a laminated assembly prior to cutting the laminate blank 210. Two or more layers of the laminate blank 210 can be assembled in sheet form and cut into the desired blank shape 222 after pre-bonding or pre-attaching the two or more layers. Gerber cutting is an exemplary process to pre-cut the layers into the blank shape 222 and/or cut the laminate blank 210 shape out of two or more assembled layers.

It will be appreciated that more or less layers may be included in the laminate blank 210 as desired for a particular application. Further, it will be appreciated that additional layers may be added to the laminate blank 210, such as a seat heater or an additional foam layer having a different density, to form a quad-layer laminate or a multi-layer laminate. Likewise, when the scrim backing layer 220 is omitted, the laminated blank 210 of the cover material layer 212 and the moldable foam interlayer 216 can be described as a "bilaminate blank". Optionally, a laminated blank 210 of the cover material layer 212, the foam interlayer 216, and a scrim backing layer 220 can be referred to as a "trilaminate blank". The term "laminate blank" 210 describes two or more materials laminated together and cut into a desired blank shape 222. Thus, it will be appreciated that the laminate blank 210 may comprise more or less layers than illustrated in FIGS. 13 and 15.

Generally, the laminate blank 210 has a 2-dimensional shape, i.e. the laminate blank 210 is generally flat when resting unconstrained on a flat surface. Preferably, the laminate blank 210 shape and size are configured so that minimal or no trimming is required after molding the trim cover 12 and prior to assembly with other components. An upper surface 224 of the cover material layer 212 and a lower surface 226 of the scrim backing layer 220, as orientated and assembled into the laminate blank 210, are generally referred to as "A-surface" and "B-surface", respectively, of the molded trim cover 12.

One or more adhesive layers 214, 218 fasten the cover material layer 212 and, optionally, the scrim backing layer 220 to the moldable foam interlayer 216 as illustrated in FIGS. 13 and 15. The selection of an adhesive and/or adhesive method is based in part on the choice of materials for the cover material layer 212 and the scrim backing layer 220. A variety of known adhesives, such as thermoplastic adhesives, and one-part or two-part urethane adhesives (referred to as "1K" and "2K" adhesives), are suitable for bonding certain cover material layers 212 and scrim backing layers 220 to the foam interlayer 216. The adhesive can be applied by spraying, or can alternatively be a film or web construction. Thermoplastic adhesive can be roll-coated onto one or more surfaces to be bonded. Thermoplastic adhesive can be remelted at elevated temperatures to separate the cover material layer 212 from the foam interlayer 216, and then reassemble the cover material layer 212 to the foam interlayer 216 to correct defects at any time in the life cycle of the trim cover 12. Both 1K and 2K type adhesives have a delayed curing response and act like thermoplastic adhesive in the first 4 hours, permitting rebonding if needed. The 1K and 2K adhesives cure to a permanent bond within 24 hours. Both 1K and 2K adhesive systems eventually become thermosetting materials, so the bond between the layers becomes irreversible.

As an alternative to adhesive, the cover material layer 212 and/or scrim backing layer 220 can be bonded to the foam interlayer 216 by flame lamination. Flame lamination is a commonly known process to bond one or more layers of material to a foam layer after passing the foam layer past a flame to melt the surface of the foam. Flame lamination produces a permanent bond between the foam interlayer 216, the cover material layer 212, and/or the scrim backing layer 220. One or more of the adhesive layers 214, 218 may be optionally replaced by flame lamination. The cover material layer 212, the moldable foam interlayer 216, the optional scrim backing layer 220, and/or other material layers, as desired, may be adhered to one another with flame lamination such that one or more adhesive layers 214, 218 are omitted between the respective layers 212, 216, 220.

Additionally, two or more layers 212, 216, 220 may be adhered by flame lamination prior to or after adhering one or more additional layers 212, 216, 220 with adhesive if desired. It will be appreciated that the selection of adhesive type (such as 1K or 2K urethane adhesives) and/or flame lamination is based in part on the selected cover material layer 212 and the desired processing methods. As is generally well known to those skilled in the art, certain materials are suitable for being adhered using flame lamination. Other materials may be more suitably bonded with a 1K or 2K urethane adhesive or other known adhesive. For example, certain leathers may be unsuitable for being adhered to the moldable foam interlayer 216 using flame lamination.

Further, additional adhesive layers may be used when the laminate blank 210 includes more than three layers. Also, individual layers may be adhered to an adjoining layer prior to or after cutting the layers into the blank shape 222. For example, the scrim backing layer 220 and the foam interlayer 216 may be bonded together using flame lamination or adhesive and then cut into a foam/scrim blank (not shown). The foam/scrim blank may be adhered to a pre-cut cover material blank 212 using an adhesive or flame lamination. It will be understood that any combination of adhesive, flame lamination, pre-cutting, and post-cutting, as well as material selection and number of layers, may be selected based on the desired finished trim cover 12 for a given application and/or preferred manufacturing method.

Suitable cover material layers 212 include a variety of textiles, vinyls, and leathers. Exemplary textiles include polyester, polyester blends, acrylic blends, rayon, nylon, and similar fabrics. The selection of a textile for a desired application depends on the amount of elongation in the lengthwise and the crosswise direction of the textile in conjunction with the amount of forming required during the molding process. Generally, cover material layers 212 having about 10% to about 25% elongation in both the lengthwise and crosswise directions have been found to be desirable. However, cover material layers 212 with more or less elongation may be suitable depending on the desired 3-dimensional molded shape and the amount of concavity in the mold tools. Fabrics can have a flat surface, a knap construction, and/or be woven or non-woven, depending on the desired appearance of the molded trim cover 12. Optionally, fabrics can be laminated with foam materials or spacer fabric constructions to generate a desired appearance of the molded trim cover 12.

A wide selection of cover material layers 212 are suitable for use with the disclosed molding process since the mold tool 96 temperature range, about 150° F. to about 320° F., is below the distortion temperatures for a variety of fabrics. Molding the trim cover 12 by applying heat in a temperature range of about 150° F. to about 320° F. allows for an expanded selection of cover material layers 212, including a variety of fabrics, vinyls, and leathers. Certain fabrics are unsuitable for use in known prior art molding processes having molding temperatures in a range of about 300° F. to about 480° F. since these fabrics may get distorted or damaged by the higher level of heat. Lowering the mold tool 96 temperature to a range of about 150° F. to about 320° F. reduces and/or prevents fabric distortion during the molding process. Further, the lower molding temperatures used in the disclosed process allows for an increase in obtainable contour of the 3-dimensional shape of the molded trim cover 12 without distorting or damaging the cover material layer 212. Additional materials and/or laminate layers can be molded into a 3-dimensional shape by optionally adding vacuum assist and a removable barrier film to the molding process, as will be described below.

As shown in FIGS. 14 and 15, the moldable foam interlayer 216 underneath the cover material layer 212 is used to achieve the desired final molded shape and to provide a soft and comfortable feel in the molded trim cover 12. The firmness, density, and thickness of the moldable foam interlayer 216 are selected to achieve a desired look or feel of the vehicle seat assembly 10. The moldable foam interlayer 216 is an open cell polyurethane (PU) foam formulated to be moldable at temperatures between about 220° F. to about 260° F. as desired for an intended application.

As is generally known in the art of manufacturing polyurethane foams, the glass transition temperature (Tg) of polyurethane foam is related to the upper limit of service temperature of the PU foam as well as the temperature at which the PU foam can be molded. Further, it is well known in the art that the Tg of a PU foam is affected by the foam chemistry, and in particular, the amount of cross-linking in the PU foam. Adding a graft polyol as well as adjusting diol content is one method of adjusting the Tg of PU foam. The Tg of PU foam can be controlled such that a selected moldable PU foam can be molded at temperatures between 220° F. to about 260° F. and still maintain support for the occupant and pass all applicable testing requirements, including life cycle, durability, and heat-aging.

Typical PU foam formulations used in vehicle seating applications are generally moldable at temperatures greater than about 320° F. These foam formulations have previously been selected in order to assure that vehicle seat assemblies 10 have acceptable performance over the life of a vehicle and to permit short manufacturing cycle times. However, the PU foams with higher Tg values are difficult to mold and require expensive and/or complex molding methods. Further, the high mold temperatures restrict options for the cover material layers 212 because some materials are unsuitable for molding at temperatures above about 320° F. In addition, some of these known molding processes result in trim covers 110 having reduced breathability.

It has been found that by reducing the Tg in moldable PU foam, satisfactory results can be obtained molding trim covers 12 with a foam molding temperature of about 220° F. to about 260° F., as disclosed in the present invention. Further, since the foam molding temperature is about 260° F. or less, the cost and complexity of the mold tools 96 is reduced and the range of suitable cover material layers 212 is increased.

The optional scrim backing blank 220 is illustrated in FIG. 14. As shown, the scrim backing layer 82 has been pre-cut into the scrim backing blank 220 prior to assembly into the laminate blank 210. The scrim backing layer 82 improves the handling of the molded trim cover 12 when sewn to other components in an assembled trim cover 12. However, it will be appreciated that the scrim backing layer 220 may be omitted if desired.

While the scrim backing layer 82 may be a woven or non-woven fabric, the elongation in the fibers of the scrim backing layer 82 impacts the formability of the laminate blank 210 during the molding process. Fabrics with greater elongation in the fibers are preferred over fabrics with less elongation in the fibers when molding highly-contoured molded trim covers 12. Further, selecting a cover material layer 78 and scrim backing layer 82 having similar elongation in the fibers is preferred. Some common non-woven scrim backing layers 82 have suitable properties for both elongation and loop attachment behavior. Non-woven scrim backing layers 82 are inexpensive and pass typical warranty criteria, assembly criteria, and disassembly criteria.

An embodiment of the present invention is illustrated in FIGS. 16A-16B showing a laminate blank 252 having a seat heater 254 positioned adjacent an A-surface cover material layer 256. Seat heaters 254 are a desired option for automotive seats. Molded trim covers 12 can have improved comfort over traditional cut-and-sew cover designs. Further, the seat heater 254 can be placed closer to the occupant when the seat heater 254 is integrated into the molded trim cover 12 than when the seat heater 254 is placed beneath the trim cover 12. The seat heater 254 is included in the laminate blank 252 prior to compression molding the laminate blank 252 into the molded trim cover 12.

A schematic view showing the construction of the laminate blank 252 having the integrated seat heater 254 is shown in FIG. 16A. The laminate blank 252 is assembled by adhering an upper surface 258 of the seat heater 254 to a lower side 260 of the A-surface cover material layer 256. Adhesive layer 264 can be applied to one or both of the upper surface 258 of the seat heater 254 and/or the lower surface 260 of the A-surface cover material layer 256 as full surface coverage or applied in local areas as desired for a specific application. A lower surface 266 of the seat heater 254 is adhered to an upper surface 268 of a moldable foam interlayer 270 by applying an adhesive layer 272 to one or both of the lower surface 266 of the seat heater 254 and/or the upper surface 268 of the moldable foam interlayer 270 with local application or full coverage of adhesive as desired. A non-woven scrim backing layer 274 is adhered to a lower surface 276 of the moldable foam interlayer 270 using adhesive layer 278. FIG. 16B illustrates a schematic view of the laminate blank 252 with the integrated seat heater 254 after the layers shown in FIG. 16A are adhered together.

It will be appreciated that the individual layers shown in FIG. 16A can be assembled in any order suitable for an intended application and desired manufacturing process. Further, it will be appreciated that any suitable adhesive may be selected based on the desired manufacturing process and composition of the A-surface cover material layer 256. In addition, it will be appreciated that adhesive layer 278 can be replaced with flame lamination as is generally known in the art. For example, the non-woven scrim backing layer 274 may be adhered to the moldable foam interlayer 270 using adhesive or using flame lamination. Optionally, the non-woven scrim backing layer 274 can be prebonded to the moldable foam interlayer 270 via adhesive or flame lamination, optionally cut into the desired blank shape 222 before or after bonding, and supplied as a subassembly S to be adhered with the seat heater 254 and A-surface cover material layer 256. Thus, the laminate blank 252 can be assembled from one or more precut blanks (A-surface cover material layer 256, seat heater 254, moldable foam interlayer 270, scrim backing layer 274, etc.) and/or assembled from precut blanks comprising a single layer or subassemblies of at least two layers, and/or assembled as a laminate assembly and cut into the final laminate blank shape after the layers are bonded together. It will also be appreciated that additional layers can be incorporated into the laminate blank 252 and that certain layers, such as the scrim backing layer 274, may be optionally omitted as desired.

Adhering the seat heater 254 directly to the lower side 260 of the A-surface cover material layer 256 helps minimize the time-to-first sensation for a seat occupant. However, there is a risk of the seat heater 254 reading through certain A-surface cover material layers 256 as shown in FIG. 16C. FIG. 16C shows a molded seat back trim cover 280 having the integrated seat heater 254 adhered to the lower side 260 of the A-surface cover material layer 256 after compression molding the laminate blank 252 shown in FIG. 16B. Seat heater electrical wires 282 extend from an edge 283 of the molded seat back trim cover 280. The seat heater 254 may slightly read though the A-surface cover material layer 256 as indicated by 284 in FIG. 16C. For some thin A-surface cover material layers 256, the shape and texture of the seat heater 254 may be visibly evident and/or the seat heater 254 may reduce comfort for the occupant. However, the design and construction of the trim cover 12 can be adjusted to minimize the visual impression of the seat heater 254. For example, placement of molded lines 72 and molded surface concavity 74 can render the read through of the seat heater 254 imperceptible to the occupant.

Figure 17A:
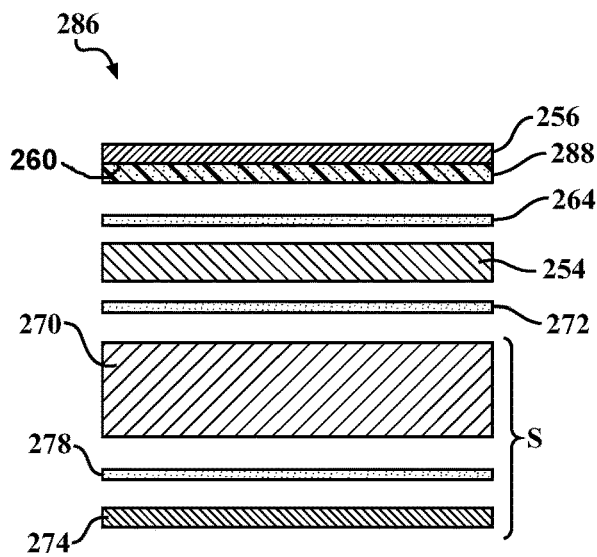
FIGS. 17A and 17B are schematic views of a second embodiment of a laminate blank having a heating element according to embodiments of the present invention.
Figure 17B:
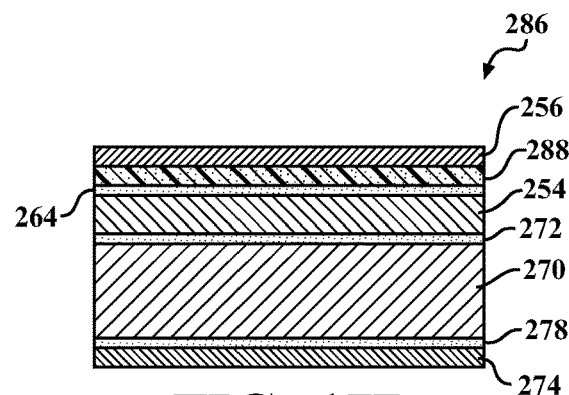
Figure 17C:
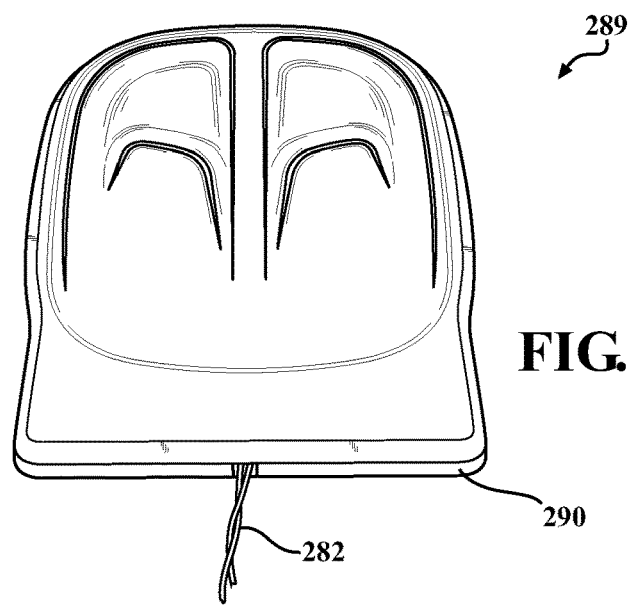
FIGS. 17C and 17D are perspective views of a molded seat back trim cover having an integrated heater according to another embodiment of the present invention.
Figure 17D:
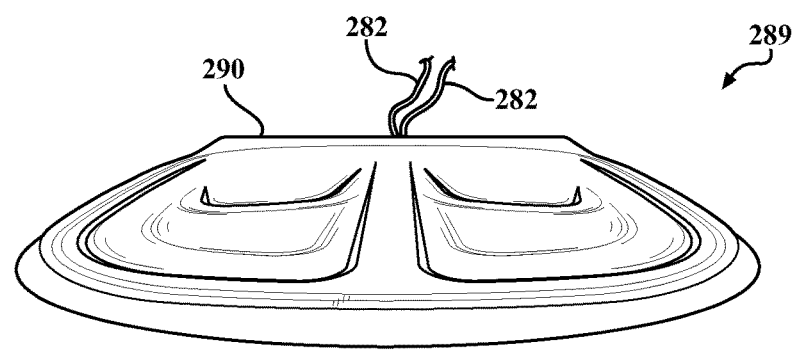

An alternate embodiment of a laminate blank 286 construction incorporating a seat heater 254 is shown in FIGS. 17A and 17B that reduces the visible appearance of the seat heater 254 on the surface of the molded trim cover 12. FIGS. 17A and 17B illustrate schematic views of layers before they are assembled into the laminate blank 286 and after they are adhered into a laminate blank 286, respectively. The construction of the laminate blank 286 is similar to the embodiment shown in FIGS. 16A and 16B with an additional layer of foam lining 288 prelaminated to the lower side 260 of the A-surface cover material layer 256. The prelaminated foam lining 288 can be adhered to the A-surface cover material layer 256 using adhesive or flame lamination as desired and as suitable for the choice of A-surface cover material layer 256. Furthermore, the moldable foam interlayer 270 may be adhered to the optional scrim backing layer 274 prior to assembling the laminate blank 286. The prelaminated foam interlayer/scrim backing layers 270, 274 and the prelaminated A-surface cover material layer/foam lining 256, 288 are adhesively bonded to a respective side of the seat heater 254 as illustrated in FIGS. 17A and 17B. A molded seat back trim cover 289 with an integrated seat heater 254 is shown in FIGS. 17C and 17D. The foam lining 288 prelaminated to the A-surface cover material layer 256 reduces and/or eliminates the read through of the seat heater 254 through the A-surface cover material layer 256 as illustrated in FIG. 17C. Seat heater electrical wires 282 extend from an edge 290 of the molded seat back trim cover 289. FIG. 17D is a top perspective view of the molded seat back trim cover 289 shown in FIG. 17C and illustrates the plushness of the trim cover 289 after the compression molding process. The inclusion of the foam lining 288 between the seat heater 254 and the A-surface cover material layer 256 somewhat increases the apparent plushness of the trim cover 289.

As in the prior embodiment shown in FIGS. 16A and 16B, the selection of adhesive layer 278 or flame lamination, as well as the desired coverage of adhesive layers 264, 272 is based on the intended application and preferred manufacturing methods. Likewise, the individual layers can be adhered into an assembly prior to cutting the laminate blank 286 out of the adhered layers. Alternatively, the individual layers can be precut into the desired blank shape 222 prior to assembly. It will be appreciated that any combination and order of cutting, assembling, and adhering desired for an intended application can be selected. For example, the A-surface cover material layer 256 can be prelaminated to the foam lining 288 using an adhesive or using flame lamination. Similarly, the moldable foam interlayer 270 can be prelaminated to the scrim backing layer 274 using an adhesive or using flame lamination.

Further, it will be appreciated that more or less layers can be incorporated into the laminate blank 286 than shown in the Figures. It will be appreciated that one or more sensors, electrical circuits, and/or alternate materials such as fiber batting in place of and/or in addition to the foam lining 288 can be incorporated into laminate blank 286 if desired. Also, while not specifically shown in the Figures, the A-surface cover material layer 256 can comprise one or more pieces of material fastened together along a seam and/or layered together if desired. For example, a pocket can be pre-sewn to the A-surface cover material layer 256 and/or two or more materials sewn together along seams to create a desired style, as will be further described below with respect to FIGS. 27A-30E.

Figure 18:
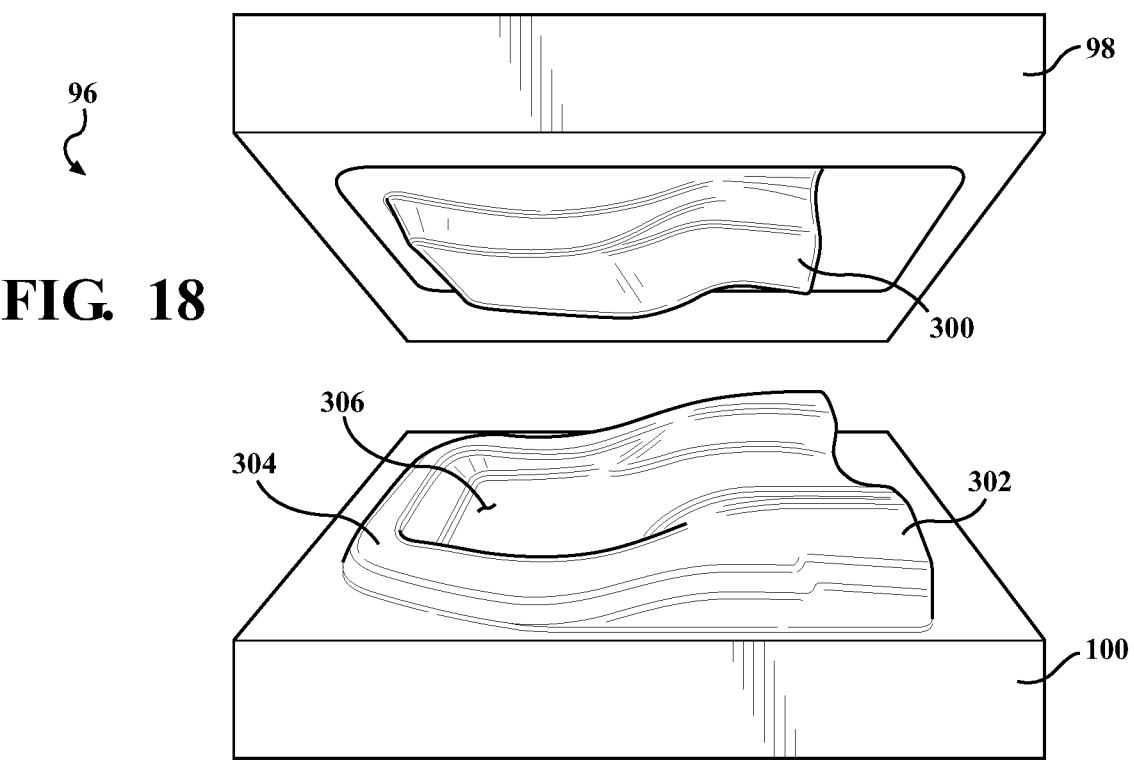
FIG. 18 illustrates a perspective view of a lower mold tool surface and an upper mold tool surface according to an embodiment of the present invention.
Figure 19:
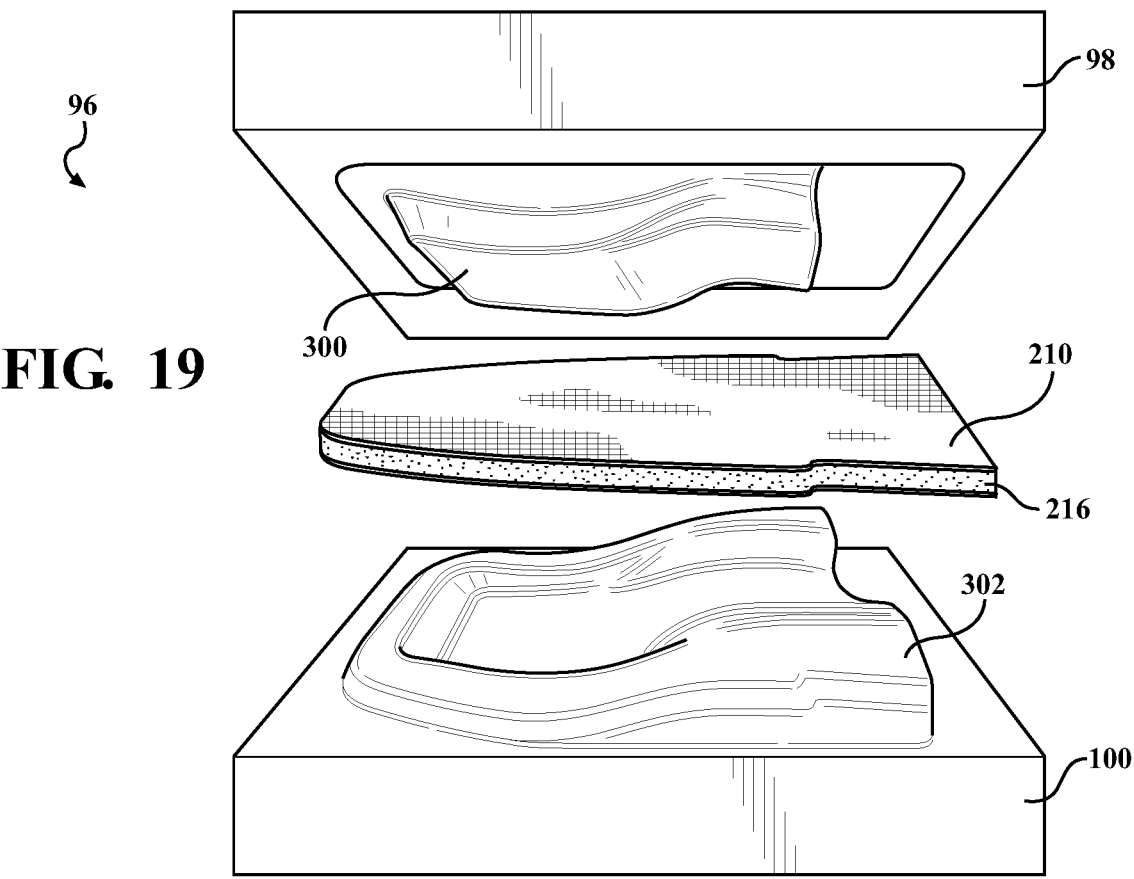
FIG. 19 illustrates a perspective view of the trilaminate assembly of FIG. 15 inserted between the lower mold tool surface and the upper mold tool surface of FIG. 18 according to an embodiment of the present invention.
Figure 20:
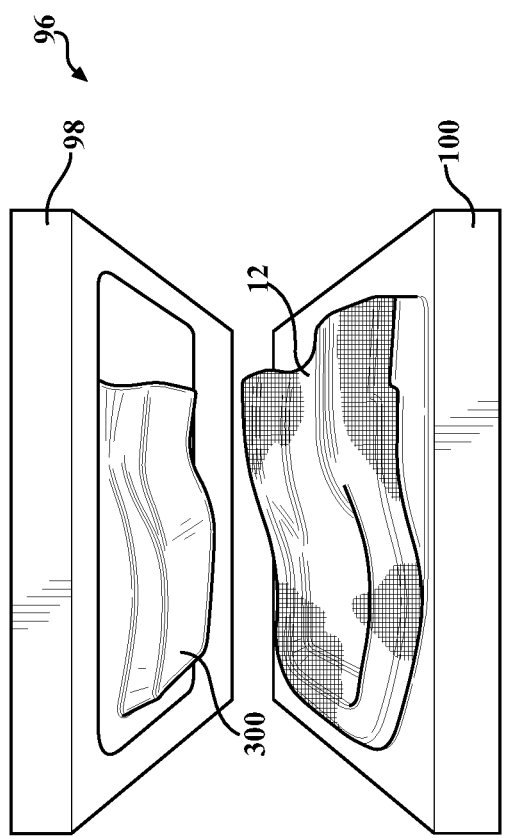
FIG. 20 illustrates a perspective view of the trilaminate assembly of FIG. 15 and the mold tools of FIG. 19 after a molding process according to an embodiment of the present invention.

A tool for molding trim covers 12 from preformed laminate blanks 210, according to one embodiment of the present invention, is illustrated in FIGS. 18-20. Generally, the molding process comprises the steps of 1) assembling a laminate blank 210, 2) placing the laminate blank 210 in a 3-dimensional compression mold tool 96, 3) molding the laminate blank 210, at a mold tool temperature of about 150° F. to about 320° F., and at a mold tool pressure of about 150 psi to about 250 psi, to form a 3-dimensional shaped molded trim cover 12, and 4) removing the trim cover 12 from the mold tool 96. It will be appreciated that the disclosed process may include more or less processing steps, as well as a different sequence of steps, as desired for a specific intended application or manufacturing process.

Exemplary upper and lower mold tools 98, 100 are shown in FIG. 18. The upper and lower mold tools 98, 100 have molding surfaces 300, 302 with a 3-dimensional shape, optionally one or more protrusions 304, and optionally one or more recessed areas 306. The upper and lower mold tools 98, 100 can have different surface temperatures to be more compatible with various constructions of the cover material layer 212 and foam interlayer 216. The 3-dimensional shape is formed in a trim cover 12 by placing a laminate blank 210 between the upper 3-dimensionally shaped mold tool 98 and the lower 3-dimensionally shaped mold tool 100, as generally illustrated in FIG. 19, compressing the laminate blank 210 between the upper and lower mold tools 98, 100 with about 150 psi to about 250 psi, and applying heat in a temperature range of about 150° F. to about 320° F. to shape and compress the moldable foam interlayer 216, and removing the upper mold tool 98 from the molded trim cover 12 (illustrated in FIG. 20) after a processing time of about 90 seconds to about 10 minutes. The amount of localized compression, as well as the formed induced surface inclination, results in a formed 3-dimensional trim cover 12 after molding which generally retains the desired 3-dimensional shape.

It will be appreciated that the compression molding process may incorporate vacuum assist as desired for certain selected materials, thickness of the laminate blank 210, as well as the degree of contour in the upper and lower molding surfaces 300, 302. While not shown in the Figures, integrating vacuum assist as well as overall heating and/or spot heating into the upper and lower mold tools 98, 100 is generally known to one skilled in the art of fabricating molding tools.

As illustrated in FIG. 21, an alternate embodiment of the disclosed process includes a step of vacuum-form assist prior to a compression molding step. Alternatively, the vacuum-form assist step can be performed during the compression molding step if desired. Improved appearance, increased 3-dimensional depth, and improved molded details can be obtained with certain materials, such a leather and/or thicker materials or laminate blanks 210 with more than three layers, by adding vacuum assist during the molding process to partially or completely pre-form the laminate blank 210 against the lower molding surface 100.

Figure 21C:
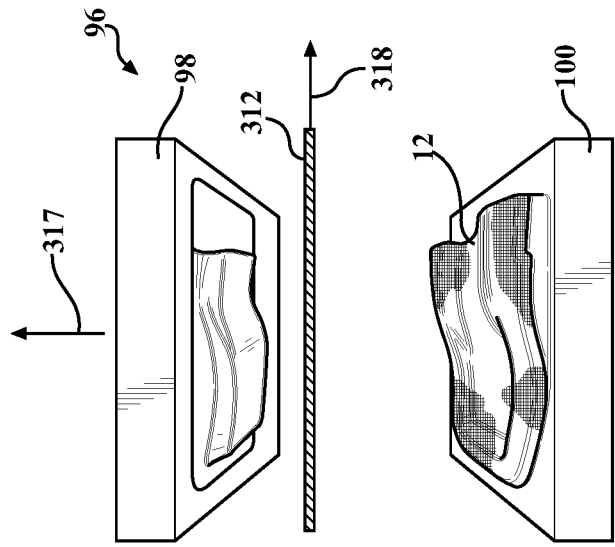
FIG. 21 illustrates a perspective view of an alternate molding process according to another embodiment of the present invention.
Figure 21B:
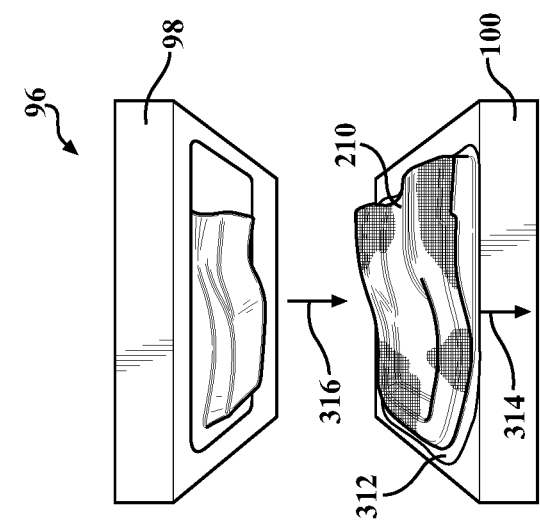
Figure 21A:
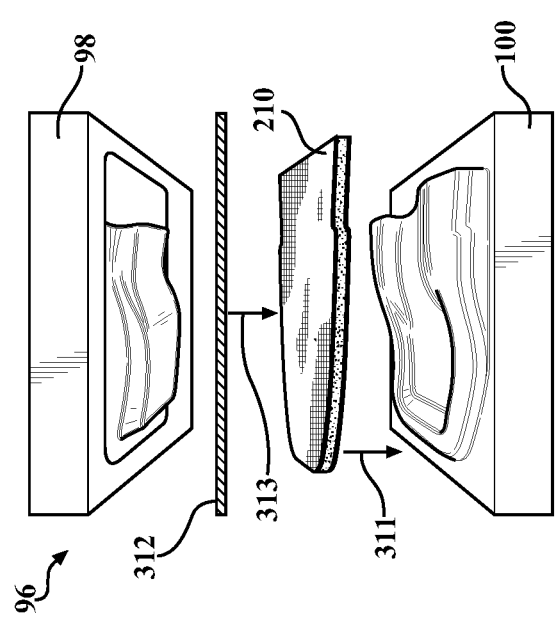

Referring to FIG. 21(A), a laminate blank 210 is placed (arrow 311) on the lower molding tool 100 and a barrier film 312 is placed (arrow 313) on top of the laminate blank 210. Vacuum 314 is applied through the lower mold tool 100 to partially or fully form the laminate blank 210 to the lower mold tool 100 as illustrated in FIG. 21(B). The upper molding tool 98 is compressed 316 against the barrier film 312 and the laminate blank 210 while the upper and/or lower molding tools 98, 100 are heated to a temperature of about 150° F. to about 320° F. to shape and compress the moldable foam interlayer 216. The molding tools 98, 100 optionally may be uniformly heated or may have localized areas with increased heat temperature, as desired for an intended application and laminate blank 210 construction.

The upper molding tool 98 is removed from the barrier film 312 and molded trim cover 12 (arrow 317) as shown in FIG. 21(C). The barrier film 312 is removed from the molded trim cover 12 (arrow 318), and the molded trim cover 12 is removed from the lower molding tool 100. Optionally, the barrier film 312 can be removed from the vacuum-formed laminate blank 210 prior to the laminate blank 210 being compressed by the upper mold tool 98 and heated to a temperature of about 150° F. to about 320° F. Breathability of the molded trim cover 12 is generally retained since the barrier film 312 is only used during the vacuum forming process 314 and, optionally, during the compression molding process 316, and removed from the molded trim cover 12 prior to assembling the molded trim cover 12 into a finished assembly. It will be appreciated that the disclosed process may include more or less processing steps, as well as a different sequence of steps, as desired for a specific application or manufacturing process.

The selection of the molding temperature range and the location of zone heating in the mold are based, in part, on the selected cover material layer 212, the number of layers in the laminate blank 210, the selected mold design, and the amount of concavity and molding details being formed in the molded trim cover 12. Generally, utilizing a mold temperature range of about 150° F. to about 320° F. is desired. This will allow the foam interlayer 216 to mold at a temperature range of about 220° F. to about 260° F., producing acceptable molded trim covers 12 with machine cycle times from about 90 seconds to about 10 minutes depending on the forming aggressiveness and thickness of the laminate blank 210.

Compression molding pressures of about 150 psi to about 250 psi are generally sufficient to produce satisfactory results. It will be appreciated that more or less molding pressure may be desired depending on a specific application, laminate blank 210 construction, machine configuration, and other factors such as machine cycle time. A pneumatic cylinder press is generally adequate to provide the desired amount of compression force during the molding process. Aluminum molding tools are generally suitable for the disclosed molding process since the desired molding temperature range is generally equal or less than about 320° F. and the molding pressures are generally equal or less than about 250 psi. The disclosed molding process does not require steel molding tools and/or hydraulic presses, and thus, the disclosed molding process can use lower cost molding tools and lower cost machines than previously known molding methods for trim covers 12. Further, the molding tools 98, 100 can have self-contained heating systems (not shown) and can be adapted to have zonal heating as needed to facilitate more or less aggressive contours and styling lines. Vacuum assist can be integrated in the molding tools when desired for a particular application and/or laminate blank 210 construction.

Since the tooling requirements, as well as the manufacturing process requirements, are generally moderate (aluminum tools with self-contained heating in a temperature range of about 150° F. to about 320° F., compression pressures of about 150 psi to about 250 psi, and cycle times from about 90 seconds to about 10 minutes), an exemplary manufacturing process can comprise about 3 compression molding machines with a single operator loading and unloading these molding machines. By assembling and cutting the laminate blank 210 prior to the molding process, the operator can load the laminate blank 210 into each molding machine and remove the molded trim covers 12 after the molding process is completed. It is desirable to cut the laminate blanks 210 into a size and shape prior to molding such that the molded trim covers 12 require minimal and/or no trimming prior to assembly into final trim cover assemblies. By pre-bonding or pre-attaching the laminate blank 210 layers, the operator loads the laminate blank 210 into the compression molding machine instead of having to load multiple pieces.

However, it will be appreciated that more than one blank 210 can be loaded onto the lower molding tool 100 prior to initiating the compression molding process if desired for a particular application. One example process generally comprises the steps of: 1) placing a cover material blank 212 and a barrier film 312 onto the lower molding tool 100, 2) vacuum forming the cover material blank 212 to generally contour around the lower mold tool 100, 3) removing the barrier film 312 and placing a seat heater 254 on the pre-formed cover material blank 212, 4) placing a foam interlayer blank 216 on top of the seat heater 254, 5) compression molding the cover material blank 212, the seat heater 254, and foam interlayer blank 216 to form a molded trim cover 12, and 6) removing the molded trim cover 12 from the molding tools 96. Another example process generally comprises the steps of: 1) loading a laminate blank 210 onto the lower molding tool 100, 2) placing a pre-sewn pocket blank on top of the laminate blank 210, 3) compression molding the laminate blank 210 and the pocket blank to form a trim cover 12 having a pocket, and 4) removing the trim cover 12 having a pocket from the compression molding tools 96.

Compared to known trim covers 110 molded in 2-dimensional shapes, minimal bending of the trim cover 12 is required when assembling the trim cover 12 into a trim cover assembly 48 and when applying the trim cover assembly 48 to a vehicle seat 10. A reduction in the necessary bending or folding of the 3-dimensional molded trim cover 12 reduces the wrinkling induced compared to a 2-dimensional molded trim cover 110. While less bending of the trim cover 12 is required when the trim cover 12 is assembled to a vehicle seat 10, the trim cover 12 can be bent and twisted during assembly with additional seat cover components without permanently distorting the molded trim cover 12. When the trim cover 12 is unrestrained, the trim cover 12 tends to generally return to the as-molded shape.

Edges of the molded trim cover 12 are optionally trimmed and/or skived prior to assembling and/or sewing with other seat cover components to form the finished trim cover assembly 48.

Figure 22:
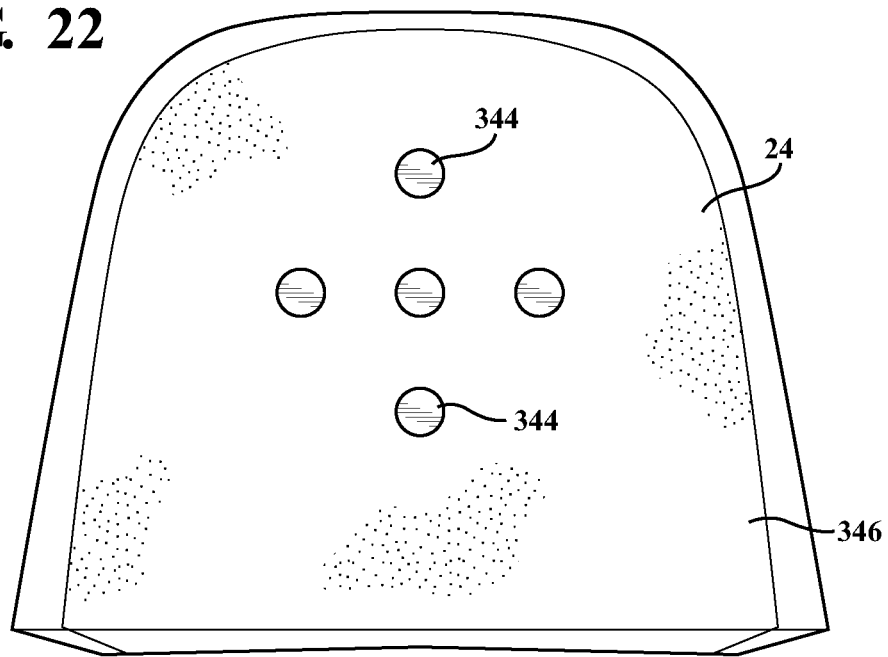
FIG. 22 illustrates a top view of a base foam pad having hook fasteners according to an embodiment of the present invention.
Figure 23:
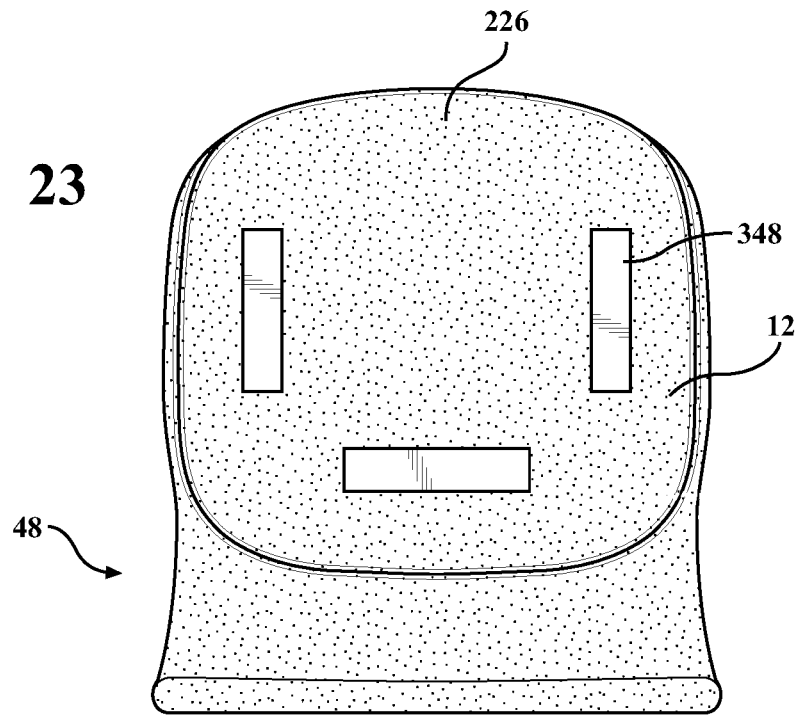
FIG. 23 illustrates a bottom view of a molded seat trim cover with locally attached loop fasteners according to an embodiment of the present invention.

The molded trim cover 12 can be permanently or releasably attached to the base foam pad 24 to form a padded assembly or during assembly of the vehicle seat 10. A simplified "hook & loop" attachment system can be integrated with the molded trim cover 12 and the base foam pad 24 that cannot be felt by the occupant of the vehicle seat 10. As shown in FIG. 22, the base foam pad 24 includes hook fasteners 344 of a "hook & loop" attachment system insert-molded to an upper surface 346 of the base foam pad 24. As shown in FIG. 23, loop fasteners 348 of a "hook & loop" attachment system are insert-molded to the "B-surface" of the molded trim cover 12. Alternatively, the loop fasteners 348 can be assembled with the lower surface of the laminate blank prior to the laminate blank 210 being molded into the trim cover 12 such that the loop fasteners 348 are permanently adhered to the lower surface of the trim cover 12 during the compression molding process. Further, the loop fasteners 348 can be adhered to the trim cover 12 prior to assembling the trim cover with the base foam pad 24. The molded trim cover 12 can be releasably coupled with the base foam pad 24 of the vehicle seat 10 after the loop fasteners 348 on the molded trim cover 12 are attached to the hook fasteners 344 on the base foam pad 24. Alternatively, some commonly used non-woven scrim backing layers 82 act as a "loop" fastener 348 of the "hook & loop" attachment system for attaching the trim cover 12 to the base foam pad 24, as shown in FIG. 24. It will be appreciated that other fastening methods may be suitable for an intended application including directly adhering the trim cover 12 to the base foam pad 24 with an adhesive. In some applications, the number and type of fasteners are reduced over certain known trim covers since the disclosed molded trim cover 12 has a 3-dimensional shape and generally retains the molded contours without additional fasteners.

After the trim cover 12 is assembled into a final seat cover assembly 48 (by adding side components and optional fasteners if needed), the seat cover assembly 48 is placed on the base foam pad 24 and forms the seat cushion 16 or seat back 14 of the vehicle seat 10, as illustrated in FIG. 3. The base foam pad 24 provides the main support surface of a seating system as well as providing stability to maintain the contours of the overall seat design. The base foam pad 24 does not require any design features when desired design features and styling lines are formed in molded "A-Surface" trim cover 12. Thus, a standardized base foam pad 24 can be used with many vehicle seat 10 designs when combined with a variety of trim cover 12 designs. Using a standardized base foam pad 24 reduces complexity in the foam manufacturing plants and seat assembly processes. There is a reduction in scrap and rework during the manufacturing process by including the design features in a removable trim cover 12 in combination with a simplified base foam pad 24.

FIGS. 25 and 26 show a molded trim cover 12 before and after, respectively, undergoing GMW 14124 Cycle Q environmental aging. The GMW 14124 Cycle Q, a General Motors Worldwide standard test protocol, subjects samples to 176° F. temperature and 75% humidity over 400 hours to evaluate the trim cover 12 for durability and suitability for an automotive interior environment. The trim cover 12 must exhibit no delamination, no color distortion, and no un-forming of the foam interlayer 80 during the test. As illustrated in FIG. 26, the trim cover 12 demonstrated no delamination, no color distortion, and no un-forming of the foam interlayer 80 after undergoing the GMW 14124 Cycle Q environmental testing.

While not shown in the Figures, trim covers 12 were evaluated for volatile organic carbon compound (VOC) emission using Ford WSS-M99P2222-F1 test method by testing a trim cover 12 at 149° F. for 120 minutes and recording key emissions from the trim cover 12. A first trim cover 12 with a fabric cover material layer 78 and a first foam interlayer 80 and a second trim cover 12 with a vinyl cover material layer 78 with a second foam interlayer 80 were evaluated. Both test samples had acceptable test results.

Further, various trim covers 12 were evaluated for breathability by measuring airflow rate through the trim cover 12. The breathability of a trim cover 12 is measured by placing a sample of the trim cover 12 in a Gurley Densometer and measuring the time to pass 300 ml of air through the trim cover 12 per ASTM D-726-58 and ASTM D-202-77 test methods. Samples of trim covers, manufactured with the traditional cut-and-sew method, the PureFit™ method, the Cover Carving Technology™ (CCT), and the disclosed molding process, were evaluated for breathability. The airflow rate through the cut-and-sew trim cover sample was about 150 ml/sec. The airflow through the CCT trim cover sample and the PureFit™ trim cover sample were about 15 ml/sec and about 10 ml/sec, respectively. In comparison, the sample of the trim cover 12 prepared by the disclosed molding process had an airflow rate of about 100 ml/sec. Thus, trim covers 12 prepared by the disclosed molding process allow about 6 to 10 times more airflow through the trim cover 12 when compared to trim covers manufactured using the CCT method or the PureFit™ method. While the airflow through the trim covers 12 prepared using the disclosed molding process is less than the airflow through traditional cut-and-sew trim covers, the thermal comfort to an occupant of an assembled vehicle seat 10 is comparable to the cut-and-sew trim cover.

Alternate embodiments of the seat back panel 54 construction are shown in FIGS. 27A-29. Two or more pieces 350, 352 of cover material 78 can be sewn together along seams 354 as shown in FIGS. 27A and 27B if desired. The sewn cover material 78 can be included into the laminate blank 210 as the A-surface cover material layer 78. The sewn seams 354 are encased and molded flush during the molding process. The resulting molded seat back panel 54 can include additional styling and design details by combining one or more materials into the A-surface cover material layer 78 of the laminate blank 210 prior to molding.

While not specifically shown in the Figures, some complex seat trim covers 12 may be assembled by sewing/adhering one or more preformed sections of the trim cover 12 together along seams to form more complex shapes of finished trim covers 12. Further, secondary processes, such as sewing and/or adhering pockets and other design details, can be done after the molding of the trim cover 12. It will be appreciated that cover materials 78 with sewn seams 354 can be incorporated into the laminate blank 210 for any trim cover part 12, such as the seat cushion trim cover 50, seat back trim cover 52, seat back panel 54, and any other similar trim cover 12.

Further, as illustrated in FIGS. 28 and 29, secondary features such as pockets 356 can be integrated into the laminate blank 210 prior to molding the trim cover 12. FIG. 28 shows a pocket 356 sewn into seams 354 of the A-surface cover material layer 78 prior to being integrated into a laminate blank 210. The sewn seams 354 are encased and molded flush when the laminate blank 210 is compression molded. A molded seat back panel 54 having a full overlay pocket 358 is shown in FIG. 29. The pocket 358 can be sewn or adhered to the A-surface cover material layer 78 prior to being integrated into the laminate blank 210. Alternatively, the pocket 358 can be placed on top of the laminate blank 210 after the laminate blank 210 is placed on the lower molding tool 100 if desired. Further, the pocket 358 can be molded into a 3-dimensional shape and then sewn or adhered along the edges to a molded trim cover 12. It will be appreciated that the disclosed process may include more or less processing steps, as well as a different sequence of steps, as desired for a specific intended application, selected materials, and/or desired manufacturing process.

Figure 30C:
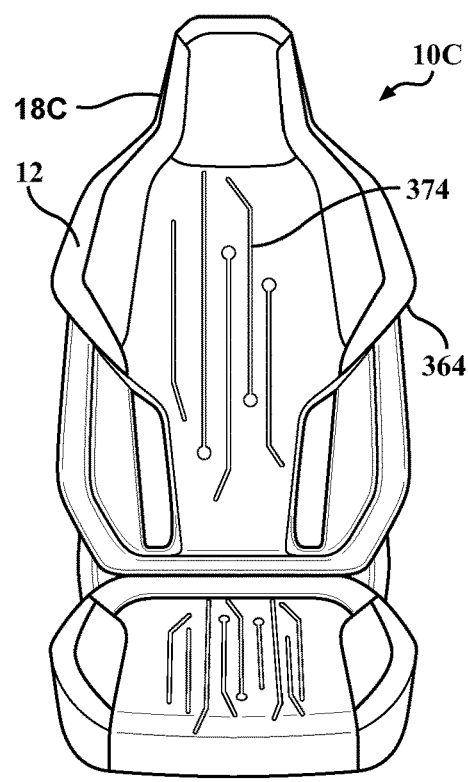
Figure 30D:
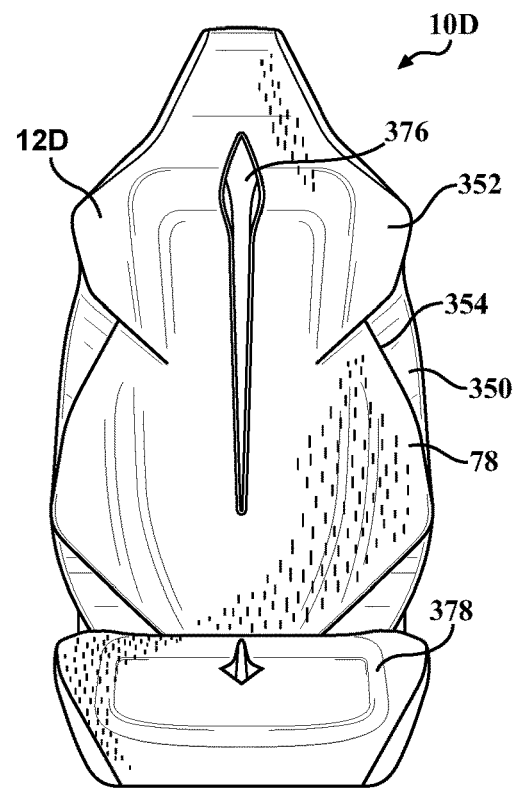

FIGS. 30A-30E illustrate non-limiting examples of vehicle seats 10 having a variety of trim cover 12 designs according to embodiments of the present disclosure. Seat 10A (FIG. 30A) illustrates a single A-surface cover material layer 78 with trim covers 12A having strongly contoured mold lines 364, subtle mold lines 366 flowing across the seat cushion 16A, seat back 14A, and head restraint 18A and fading flush to the local surface at the end 368 of the mold lines 366. Seat 10B (FIG. 30B) illustrates a seat back trim cover 52B having two cover materials 350, 352 sewn along seams 354 prior to assembling the laminate blank 210 and molding the trim cover 12B. Also shown in FIG. 30B are surface embossments 372 formed in the trim cover 12B during the molding process. Seat 10C demonstrates stylized embossments 374 and strong contoured mold lines 364, as well as an integrated head restraint 18C, as shown in FIG. 30C. A variation is illustrated in FIG. 30D of two materials 350, 352 sewn along seams 354 to form the sewn cover material 78 prior to assembling the laminate blank 210 and molding the trim cover 12D. Seat 10D also illustrates the first material 350 having a napped fabric and the second material 352 being perforated leather, as well illustrating strong stylized contoured design features 376 and subtle surface contour 378.

Figure 30E:
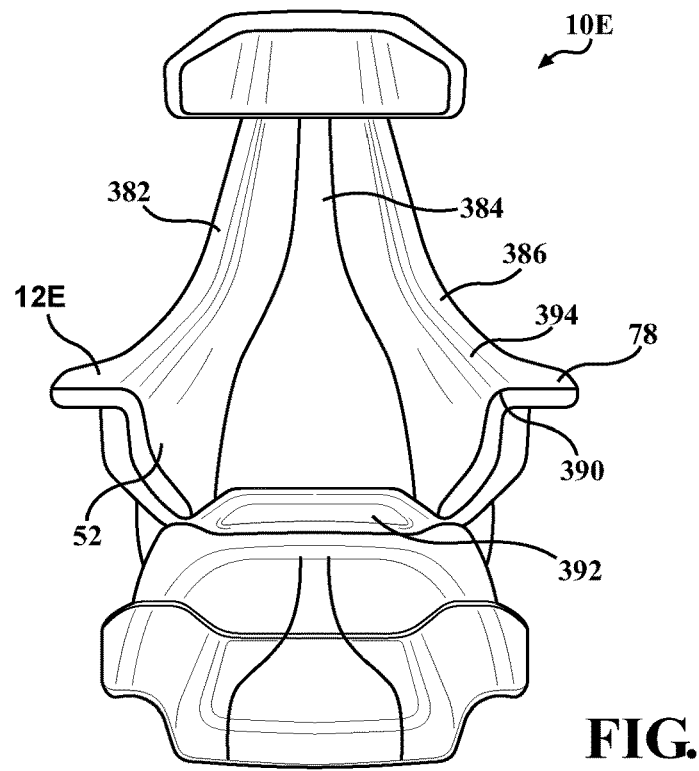

Contours with greater than about 4 inches of concavity can optionally be formed by joining smaller molded trim cover sections 382, 384, 386 such as shown in FIG. 30E. Alternatively, for certain laminate constructions and/or A-surface cover material layers 78, a trim cover 12E having substantially greater than about 4 inches of overall concavity can be molded using the disclosed process. Generally, up to about 4 inches of localized concavity is desired. Sharp bends 390 and gradual changes 392 in surface profile 394 can increase the overall concavity well beyond the recommended localized concavity recommendations. Thus, depending on the laminate blank 210 construction, the seat back trim cover 52 of seat 10E shown in FIG. 30E can be formed as a single molded seat back trim cover 52 or formed by joining smaller molded trim cover sections 382, 384, 386 as desired.

Another embodiment is illustrated in FIGS. 31A-31C where portions of the seat cushion trim cover 50 include molded seat belt pockets 396, 398. Certain known vehicle seat covers have highly contoured sections that are formed by cutting and sewing multiple small pieces of material together. One example is seat belt pockets for rear seat cushions. Typically, multiple pieces of material are cut and sewn together along seams to form generally complex contours required for a seat belt pocket. Cutting and sewing multiple small pieces is costly and labor intensive. These multi-piece sewn seat belt pockets can be replaced by molded seat belt pockets 396, 398 compression molded from laminate blanks 210 with the disclosed process. Seat pocket 396, shown in FIGS. 31A and 31B, illustrates a molded complex pocket shape sewn to a seat cushion trim cover 50. In comparison, seat pocket 398 illustrates a narrow U-shape pocket with a tight bend at the base 400 of the U-shape (shown in FIGS. 31A and 31C).

It will be appreciated that any combination of materials, fabrics, and number of pieces may be used to create the desired styling of trim covers 12 and similar components. While not specifically shown in the Figures, the molded trim covers 12 are suitable for any interior component of a vehicle, including armrests or door panels. While the above disclosure is directed primarily towards vehicle seat trim covers 12, this process can be used to form any cover piece for automotive interiors or for household products. Complex shapes can be molded from the laminate blank 210, eliminating sewing of multiple pieces to form complex shapes.

The disclosed FreeForm™ trim covers and other component manufactured using the FreeForm™ process have many benefits over other known methods of manufacturing trim covers. One benefit is the FreeForm™ trim covers have similar breathability to traditional cut-and-sew trim covers while eliminating most or all of the sew seams. A second benefit is the amount of styling details, contours, and complexity in the trim cover can be increased over what is practical with the traditional cut-and-sew covers. A third benefit is the manufacturing process has a low tooling cost which further permits quickly updating styling changes by replacing the lower cost mold tools. A fourth benefit is the integration of seat heaters and other components directly into the trim cover during the preparation of the laminate blank. A fifth benefit is a seat trim cover having a seamless styling surface with hidden tie downs. Another benefit is the FreeForm™ process is suitable for manufacturing other contoured covers and similar parts for a variety of automotive and household applications.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat trim cover for a vehicle seat, comprising:
a moldable polyurethane cellular foam interlayer having an upper surface and a lower surface, the moldable polyurethan cellular foam interlayer formulated to be moldable at a temperature between about 220° F. to about 260° F.;
a cover material having a lower surface, said lower surface adhered to said upper surface of said moldable polyurethane cellular foam interlayer to form a laminate blank;
said cover material comprising one or more of a vinyl, fabric, and/or leather; and
a scrim backing adhered to the lower surface of said moldable foam interlayer wherein said scrim backing is one of a woven or a non-woven fabric;
wherein said laminate blank is formed into a 3-dimensional shape.

2. The seat trim cover as set forth in claim 1, wherein:
said cover material is adhered to said upper surface of said foam interlayer using a one part urethane adhesive, a two part urethane adhesive, or flame lamination.

3. The seat trim cover as set forth in claim 2, further including:
a seat heater adhered between said lower surface of said cover material and said upper surface of said moldable foam interlayer.

4. The seat trim cover as set forth in claim 3, further including:
a foam liner adhered between said lower surface of said cover material and said seat heater.

5. The seat trim cover as set forth in claim 1, wherein:
said scrim backing is adhered to said lower surface of said foam interlayer using a one part urethane adhesive, a two part urethane adhesive, or flame lamination.

6. The seat trim cover as set forth in claim 5, wherein:
said trim cover has at least one molded feature having an appearance of a sewn seam.

7. The seat trim cover as set forth in claim 6, wherein:
said trim cover has at least a portion molded into a curved profile.

8. The seat trim cover as set forth in claim 7, wherein:
said trim cover has at least one embossed feature molded into said trim cover.

9. A trim cover for a vehicle component, comprising:
a laminated assembly having at least a cover material adhered to a moldable polyurethane cellular foam interlayer to form said laminated assembly;
said moldable polyurethane cellular foam formulated to be moldable at a temperature in a range of about 220° F. to about 260° F.;
said cover material comprises at least two pieces sewn together along at least one edge of each of said at least two pieces to form a sewn cover material having at least one sew seam;
said laminated assembly comprises at least said sewn cover material, and
said edges of said at least one sew seam are encased within said trim cover;
wherein said laminated assembly has a 3-dimensional shape having at least one molded feature.

10. The trim cover as set forth in claim 9, wherein:
said trim cover is one of a seat cushion trim cover, a seat back trim cover, a seat back panel, a seat back pocket, a head restraint cover, an armrest cover, or a seat belt pocket.

11. The trim cover as set forth in claim 10, wherein:
said cover material comprises one or more of a vinyl, fabric, and/or leather.

12. The trim cover as set forth in claim 11, wherein:
said laminated assembly includes at least one or more of a seat heater, a sensor, an electrical circuit, a fastener, a scrim backing layer, and/or a foam lining.

13. The trim cover as set forth in claim 9, further comprising:
a pocket attached to said cover material.

14. The trim cover as set forth in claim 13, wherein:
said pocket comprises at least one pocket edge; and said at least one pocket edge is sewn within said at least one sew seam between said at least two pieces of cover material.

15. The trim cover as set forth in claim 13, wherein:
said pocket extends from one edge of said cover material to an opposing edge of said cover material; and
at least one edge of said pocket is sewn to and/or adhered to said cover material.

16. A padded assembly, comprising:
a molded trim cover having a 3-dimensional shape and releasably coupled with a base foam pad;
said molded trim cover comprising:
a lower surface of a cover material adhered to an upper surface of a moldable polyurethane cellular foam interlayer to form a laminate blank;
said cover material comprising one or more of a vinyl, fabric, and/or leather;
said base foam pad comprising a cellular polyurethane foam formulated to be moldable at a temperature between about 220° F. to about 260° F.;

said molded trim cover having at least one loop fastener of a hook and loop fastener system;

said base foam pad having at least one hook fastener of said hook and loop fastener system;

wherein said at least one loop fastener is releasably coupled with said at least one hook fastener, and said at least one loop fastener comprises one or more of a non-woven scrim backing layer adhered to said moldable polyurethane cellular foam interlayer, said at least one loop fastener adhered to a lower surface of said laminate blank, and/or said at least one loop fastener adhered to a lower surface of said molded trim cover.

17. The padded assembly as set forth in claim 16, wherein:

said padded assembly is one of a seat cushion, a seat back, a seat head restraint, or a seat armrest of a vehicle seat assembly.

18. The padded assembly as set forth in claim 17, wherein:

said laminate blank includes at least one or more of a seat heater, a sensor, an electrical circuit, a scrim backing layer, a fastener, and/or a foam lining.

\* \* \* \* \*